United States Patent
Nakanishi et al.

(10) Patent No.: US 8,986,894 B2
(45) Date of Patent: Mar. 24, 2015

(54) SOLID ELECTROLYTE INCLUDING LAYERED METAL OXIDE, FUEL CELL INCLUDING THEREOF, PRODUCTION METHOD FOR SOLID ELECTROLYTE, AND PRODUCTION METHOD FOR ELECTRODE CATALYST

(75) Inventors: Haruyuki Nakanishi, Toyota (JP); Tatsuya Takeguchi, Sapporo (JP); Hiroki Takahashi, Sapporo (JP); Ayaka Nakamura, Sapporo (JP); Saburo Hosokawa, Kyoto (JP)

(73) Assignees: Toyota Jidosha Kabushiki Kaisha, Aichi (JP); National University Corporation Hokkaido University, Hokkaido (JP)

(*) Notice: Subject to any disclaimer, the term of this patent is extended or adjusted under 35 U.S.C. 154(b) by 564 days.

(21) Appl. No.: 13/368,071

(22) Filed: Feb. 7, 2012

(65) Prior Publication Data

US 2012/0202128 A1    Aug. 9, 2012

(30) Foreign Application Priority Data

Feb. 9, 2011  (JP) .................. P2011-026120
Feb. 9, 2011  (JP) .................. P2011-026121
Feb. 9, 2011  (JP) .................. P2011-026125

(51) Int. Cl.
| | |
|---|---|
| *H01M 8/10* | (2006.01) |
| *H01M 8/22* | (2006.01) |
| *H01M 6/18* | (2006.01) |
| *H01M 4/86* | (2006.01) |
| *H01M 4/90* | (2006.01) |

(52) U.S. Cl.
CPC ............. *H01M 8/222* (2013.01); *H01M 6/185* (2013.01); *H01M 6/187* (2013.01); *H01M 4/8657* (2013.01); *H01M 4/9083* (2013.01); *H01M 2300/0071* (2013.01); *Y02E 60/50* (2013.01)
USPC ........... 429/304; 429/188; 429/477; 429/479; 429/491

(58) Field of Classification Search
CPC ........................ H01M 6/185; H01M 6/187
USPC .................. 429/188, 304, 477, 479, 491
See application file for complete search history.

(56) References Cited

U.S. PATENT DOCUMENTS

| | | |
|---|---|---|
| 2004/0231143 A1 | 11/2004 | Visco et al. |
| 2008/0050630 A1 | 2/2008 | Bert et al. |

FOREIGN PATENT DOCUMENTS

| | | |
|---|---|---|
| JP | 2001-093325 A | 4/2001 |
| JP | 2004-083392 A | 3/2004 |
| JP | 2005-166397 A | 6/2005 |
| JP | 2005-166481 A | 6/2005 |
| JP | 2005-285451 A | 10/2005 |
| JP | 2007-214130 A | 8/2007 |
| JP | 2008-034271 A | 2/2008 |
| JP | 2008-527658 | 7/2008 |
| JP | 2010-238547 A | 10/2010 |
| WO | 2004/102704 A1 | 11/2004 |
| WO | 2010/007949 | 1/2010 |

OTHER PUBLICATIONS

McFarlan, An Intermediate-Temerature Ammonia Fuel Cell Using Gd-Doped Barium Cerate Electrolyte, Journal of the Electrochemical Society, 151, pp. A930-A932, 2004.
Lan, Direct Ammonia Alkaline Anion-Exchange Membrane Fuel Cells, Electrochemical and Solid-State Letters, 13, B83-B86, 2010.
Nakamura et al., "Investigation into Reduction Conditions for Fe—Co—Ni/C Anode Catalyst Used in Alkaline Fuel Cell," Proceedings of Symposium A of the 106th Symposium on Catalysis, Sep. 15, 2010, p. 130.

*Primary Examiner* — Ladan Mohaddes
(74) *Attorney, Agent, or Firm* — Morgan, Lewis & Bockius LLP

(57) ABSTRACT

A solid electrolyte including a layered metal oxide represented by the formula (1), $$(La_{1-x}A_x)(Sr_{1-y}B_y)_3(Co_{1-z}C_z)_3O_{10-\delta} \quad (1)$$

[wherein A represents a rare earth element other than La; B represents Mg, Ca, or Ba; C represents Ti, V, Cr, or Mn; $0 \leq x < 1$, $0 \leq y < 1$, $0 \leq z < 1$; and $\delta$ represents an oxygen deficiency amount].

1 Claim, 14 Drawing Sheets

SOLID ELECTROLYTE INCLUDING LAYERED METAL OXIDE, FUEL CELL INCLUDING THEREOF, PRODUCTION METHOD FOR SOLID ELECTROLYTE, AND PRODUCTION METHOD FOR ELECTRODE CATALYST

BACKGROUND OF THE INVENTION

1. Field of the Invention

The present invention relates to a solid electrolyte including a layered metal oxide, fuel cell including thereof, a production method thereof and production, method for electrode catalyst.

2. Related Background Art

In Patent Document 1 (International Publication No. 2010/007949), an invention is described that relates to a fuel cell in which $NaCO_2O_4$, $LaFe_3Sr_3O_{10}$, and $Bi_4Sr_{14}Fe_{24}O_{56}$, which are layered metal oxides, are used as a solid electrolyte. These layered metal oxides are thought to have ion conductivity because they can intercalate water between the layers. In this fuel cell, a high electromotive force can be obtained even under low temperature conditions of around room temperature (about 20 to 80° C.), without using hydrazine ($N_2H_4$) for fuel or platinum as a catalyst.

SUMMARY OF THE INVENTION

In the above-described Patent Document 1, although hydrogen is used as the fuel of the fuel cell, in a fuel cell in which ammonia is the fuel and $NaCo_2O_4$ is used as a solid electrolyte, a comparatively high electromotive force as an open-circuit voltage (OCV) can be obtained. However, there is room for further improvement with respect to the theoretical value of 1.17 V.

Further, fuel cells in which $LaFe_3Sr_3O_{10}$ or $Bi_4Sr_{14}Fe_{24}O_{56}$ is used as a solid electrolyte have had the problem that an open-circuit voltage cannot be obtained if ammonia is used as the fuel.

The present invention has been made in view of the above problems. It is an object of the present invention to provide a solid electrolyte, and a production method thereof, that can obtain a high electromotive force in a fuel cell in which ammonia is the fuel.

In addition, It is also an object of the present invention to provide a fuel cell including the solid electrolyte and a production method for electrode catalyst.

To achieve the above-described object, as a result of diligent research concerning layered metal oxides that are being focused on as a solid electrolyte for fuel cells, the present inventors discovered the optimum layered metal oxide that can resolve the above-described problems, thereby completing the following invention. Specifically, the present invention provides a solid electrolyte that includes a layered metal oxide represented by the formula (1),

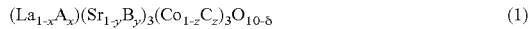
$$(La_{1-x}A_x)(Sr_{1-y}B_y)_3(Co_{1-z}C_z)_3O_{10-\delta} \qquad (1)$$

[wherein A represents a rare earth element other than La; B represents Mg, Ca, or Ba; C represents Ti, V, Cr, or Mn; $0 \le x < 1$, $0 \le y < 1$, $0 \le z < 1$; and δ represents an oxygen deficiency amount].

The solid electrolyte according to the present invention can achieve a high electromotive force that is closer to the theoretical value than a fuel cell in which $NaCo_2O_4$ is used as the solid electrolyte, by including a layered metal oxide having a specific composition represented by the formula (1). Further, based on diligent research concerning fuel cells in which ammonia is the fuel and in which $LaFe_3Sr_3O_{10}$ or $Bi_4Sr_{14}Fe_{24}O_{56}$ is used as the solid electrolyte, the present inventors inferred that, in view of the result that gas leaks tend to occur because a solid electrolyte including Fe has a poor density, and that ammonia degrades not only at the anode electrode but even at the cathode electrode, reaction selectivity is lost and a voltage cannot be obtained. In contrast, from the results of their research, since the layered metal oxide represented by the formula (1) does not include Fe and has a high density, the present inventors discovered that gas leaks do not occur easily even if using ammonia as the fuel. Further, the present inventors discovered that such a layered metal oxide can be produced with a uniform composition by using a co-precipitation method. Consequently, by using the layered metal oxide represented by the formula (1) as a solid electrolyte, a higher electromotive force than when the above-described conventional solid electrolyte is used can be obtained even for a fuel cell in which ammonia is the fuel.

The present invention provides a fuel cell which comprise an anode electrode that includes an electrode catalyst and a first layered metal oxide, wherein the first layered oxide is 50 to 150 parts by weight based on 100 parts by weight of the electrode catalyst, a cathode electrode that includes a carbon material and a second layered metal oxide, wherein the second layered oxide is 150 to 250 parts by weight based on 100 parts by weight of the carbon material and a solid electrolyte layer that is arranged between the anode electrode and the cathode electrode, and includes a third layered metal oxide, wherein the first and third layered metal oxides have been subjected to a steam treatment.

In one aspect of the present invention, regarding the fuel cell, the first, second, and third layered metal oxides may each be the same or different, and may be a layered metal oxide represented by formula (1) or $NaCo_2O_4$,

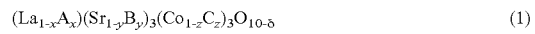
$$(La_{1-x}A_x)(Sr_{1-y}B_y)_3(Co_{1-z}C_z)_3O_{10-\delta} \qquad (1)$$

[wherein A represents a rare earth element other than La; B represents Mg, Ca, or Ba; C represents Ti, V, Cr, or Mn; $0 \le x < 1$, $0 \le y < 1$, $0 \le z < 1$; and δ represents an oxygen deficiency amount].

In one aspect of the present invention, regarding the fuel cell, the electrode catalyst may comprise an alloy material that includes an alloy portion containing Fe, Co, and Ni, and an Fe portion in which the alloy portion is not formed.

In one aspect of the present invention, regarding the fuel cell, in X-ray diffraction the electrode catalyst may exhibit two peaks derived from Fe at a diffraction angle 2θ.

In one aspect of the present invention, regarding the fuel cell, the electrode catalyst may support the alloy material on a carbon material.

In one aspect of the present invention, regarding the fuel cell, a fuel of the fuel cell may include ammonia.

The present invention provides a method for producing a solid electrolyte that includes the above-described layered metal oxide. Specifically, the method for producing a solid electrolyte according to the present invention includes a step of producing a precipitate that includes a precursor of a layered metal oxide represented by the formula (1) by adding an aqueous solution containing La, Sr, and Co to an aqueous alkali solution, and a step of calcining the precipitate that includes a precursor of the layered metal oxide,

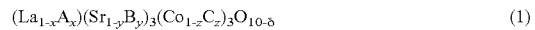
$$(La_{1-x}A_x)(Sr_{1-y}B_y)_3(Co_{1-z}C_z)_3O_{10-\delta} \qquad (1)$$

[wherein A represents a rare earth element other than La; B represents Mg, Ca, or Ba; C represents Ti, V, Cr, or Mn; $0 \le x < 1$, $0 \le y < 1$, $0 \le z < 1$; and δ represents an oxygen deficiency amount].

According to the above-described production method, by using a step of adding the above-described aqueous solution containing La, Sr, and Co to an, aqueous alkali solution, specifically, a co-precipitation method, a solid electrolyte in which the layered metal oxide represented by the formula (1) is a uniform composition can be produced.

A method for producing an electrode catalyst, comprising:
a step of obtaining a catalyst precursor by impregnating a carbon material with an aqueous solution containing Fe, Co, and Ni;
a first calcining step of calcining the catalyst precursor under a hydrogen atmosphere; and
a second calcining step of calcining the catalyst precursor that has been calcined in the first calcining step, under a hydrogen atmosphere at a lower temperature than in the first calcining step.

In one aspect of the present invention, regarding the method for producing an electrode catalyst, the temperature in the first calcining step may be 900 to 1300° C., and the temperature in the second calcining step may be 400 to 600° C.

According to the present invention, it is possible to provide a solid electrolyte, and a production method thereof, that can obtain a high electromotive force in a fuel cell in which ammonia is the fuel.

As in the above-described Patent Document 1, although a fuel cell in which a layered metal oxide is used as a solid electrolyte and an electrode material can obtain a high electromotive force, there is room, for further improvement concerning the current density.

The present invention was made in view of the above-described problems. It is an object of the present invention to provide a fuel cell that includes an electrode including a layered metal oxide and a solid electrolyte layer, which can obtain a high electromotive force and sufficient current density.

To achieve the above-described object, the present invention provides a fuel cell including an anode electrode, which includes an electrode catalyst and a first layered metal oxide, in which the first layered oxide is 50 to 150 parts by weight based on 100 parts by weight of the electrode catalyst, a cathode electrode, which includes a carbon material and a second layered metal oxide, in which the second layered oxide is 150 to 250 parts by weight based on 100 parts by weight of the carbon material, and a solid electrolyte layer, which is arranged between the anode electrode and the cathode electrode and includes a third layered metal oxide, wherein the first and third layered metal oxides have been subjected to a steam treatment.

As a result of diligent research concerning fuel cells in which a layered metal oxide is used as a solid electrolyte layer and an electrode material, the present inventors discovered that a high electromotive force and sufficient power density can be obtained by including an anode electrode and a cathode electrode that contain an electrode catalyst or a carbon material and a layered metal oxide at a specific ratio, and including as a solid electrolyte layer and the anode electrode ones in which the layered metal oxide included therein has been subjected to a steam treatment.

In the above-described fuel cell according to the present invention, it is thought that a high electromotive force and sufficient current density can be obtained because water molecules are hydrolyzed due to an oxygen defect in the layered metal oxide caused by subjecting the third layered metal oxide included in the solid electrolyte layer and the first layered metal oxide included in the anode electrode to a steam treatment, whereby hydroxide ion conductivity is exhibited.

In addition, as the anode electrode and the cathode electrode, by including ones that each include a layered metal oxide at a specific ratio, each electrode can further exhibit excellent conductivity, and consequently, a much higher electromotive force and current density can be obtained.

In the present invention, the electrode catalyst preferably has an alloy material that includes an alloy portion containing Fe, Co, and Ni, and an Fe portion in which the alloy portion is not formed. As a result of the electrode catalyst in the anode electrode being an electrode catalyst having an alloy material that includes an alloy portion containing Fe, Co, and Ni, and an Fe portion in which the alloy portion is not formed, a high electromotive force and sufficient current density can be obtained when used in a fuel cell.

The first, second, and third layered metal oxides in the present invention may each be the same or different, and preferably are a layered metal oxide represented by the formula (1) or $NaCo_2O_4$, $$(La_{1-x}A_x)(Sr_{1-y}B_y)_3(Co_{1-z}C_z)_3O_{10-\delta} \qquad (1)$$

[wherein A represents a rare earth element other than La; B represents Mg, Ca, or Ba; C represents Ti, V, Cr, or Mn; $0 \leq x < 1$, $0 \leq y < 1$, $0 \leq z < 1$; and $\delta$ represents an oxygen deficiency amount].

If the first, second, and third layered metal oxides are a layered metal oxide represented by the formula (1) or $NaCo_2O_4$, a fuel cell to which these are applied can obtain a high electromotive force and sufficient current density.

In the present invention, the fuel of the fuel cell preferably includes ammonia. By ammonia being included as the fuel of the fuel cell, the current density can be further improved.

According to the present invention, a fuel cell that can obtain a high electromotive force and sufficient current density, which includes an electrode including a layered metal oxide and a solid electrolyte layer, can be provided.

Since fuel cells can achieve a higher energy efficiency than conventional power generation technology, their realization as a power generation source with little environmental burden is anticipated. Various efforts toward realization have been made, and the development of a catalyst that can be used for a fuel cell electrode is especially drawing attention.

Here, in Patent Document 2 (Japanese Unexamined Patent Application Publication No. 2008-527658), for example, the use of an iron-cobalt-nickel catalyst as the anode catalyst in a fuel cell in which methanol or ethanol is the fuel is described.

One example of the above-described fuel cell is as a fuel cell in which ammonia is the fuel, which has advantages such as that the ammonia can be easily liquefied. However, fuel cells in which ammonia is the fuel (hereinafter sometimes referred to as "ammonia fuel cell") have the problem that when the iron-cobalt-nickel catalyst described in Patent Document 2, for example, is used as an electrode catalyst, sufficient current density cannot be obtained.

Accordingly, it is an object of the present invention to provide an electrode catalyst, and a production method thereof, which can obtain a high electromotive force and sufficient current density when applied to a fuel cell in which ammonia is the fuel.

As a result of diligent research concerning electrode catalysts that include Fe, Co, and Ni, the present inventors discovered that a high electromotive force and sufficient current density can be obtained by using a specific electrode catalyst that includes Fe, Co, and Ni in an ammonia fuel cell. Further, the present inventors also discovered a method for producing this specific electrode catalyst that includes Fe, Co, and Ni, thereby completing the following invention.

The present invention provides an electrode catalyst having an alloy material that includes an alloy portion containing Fe, Co, and Ni, and an Fe portion in which the alloy portion is not formed. Thus, the electrode catalyst having an alloy material that includes an alloy portion containing Fe, Co, and Ni, and an Fe portion in which the alloy portion is not formed can obtain a high electromotive force and sufficient current density when used in a fuel cell.

In the present invention, it is preferred that when the above-described electrode catalyst is subjected to X-ray diffraction, two peaks derived from Fe (the Fe in the above-described alloy portion and the above-described Fe portion) are exhibited at a diffraction angle 2θ. An electrode catalyst that exhibits such a characteristic can obtain a high electromotive force and sufficient current density when used in a fuel cell.

Further, in the present invention, the above-described electrode catalyst preferably supports the above-described alloy material on a carbon material. By supporting the above-described alloy material on a carbon material, handling as an electrode catalyst becomes easy.

The present invention provides a method for producing an electrode catalyst, which includes a step of obtaining a catalyst precursor by impregnating a carbon material with an aqueous solution containing Fe, Co, and Ni, a first calcining step of calcining the catalyst precursor under a hydrogen atmosphere, and a second calcining step of calcining the catalyst precursor that has been calcined in the first calcining step under a hydrogen atmosphere at a lower temperature than in the first calcining step. By the above-described production method that includes a first calcining step and a second calcining step of calcining at a lower temperature than in the first calcining step, an electrode catalyst having an alloy material that includes an alloy portion containing Fe, Co, and Ni, and an Fe portion in which the alloy portion is not formed, can be produced.

In the above-described production method, the temperature in the first calcining step is preferably 900 to 1300° C., and the temperature in the second calcining step is preferably 400 to 600° C. By setting the calcining temperature in the above-described ranges, an electrode catalyst having an alloy material that includes an alloy portion containing Fe, Co, and Ni, and an Fe portion in which the alloy portion is not formed, can be produced in a shorter time.

According to the present invention, an electrode catalyst, and a production method thereof, which can obtain a high electromotive force and sufficient current density when applied to a fuel cell in which ammonia is the fuel, can be provided.

BRIEF DESCRIPTION OF TUE DRAWINGS

DESCRIPTION OF THE PREFERRED EMBODIMENTS

First Embodiment

Figure 1:
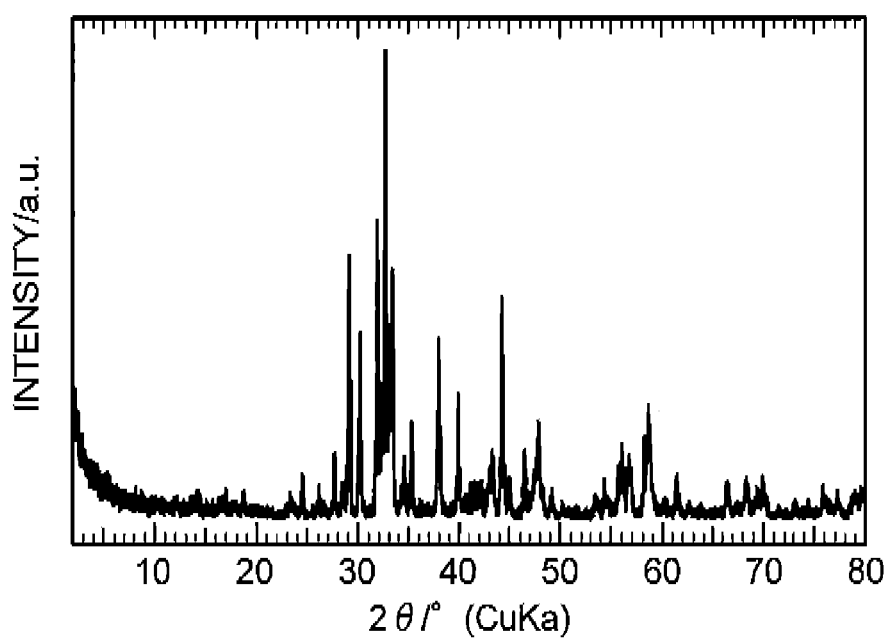
FIG. 1 is a diffraction pattern illustrating the results of structural analysis of pellet A of Example 101 by X-ray diffraction (XRD)

A preferred first embodiment of the present invention will now be described in more detail while, on occasion, referring to the drawings.

<Layered Metal Oxide>

The layered metal oxide included in the solid electrolyte according to the present invention is a perovskite type layered metal oxide having $LaSr_3Co_3O_{10}$ as a basic structure, which has a composition represented by the formula (1). The term "layered" refereed to here means a crystal structure that forms a sheet structure in which atoms or atom groups are especially aligned in a plane, in which repetition of the sheet structure can be seen in a perpendicular direction to this plane.

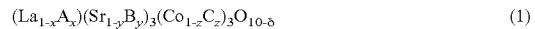

$$(La_{1-x}A_x)(Sr_{1-y}B_y)_3(Co_{1-z}C_z)_3O_{10-\delta} \qquad (1)$$

In the formula (1), A represents the element included in the La site, and is a rare earth element other than La (lanthanum). Examples of A include Sc (scandium), Y (yttrium), Ce (cerium), Pr (praseodymium), Nd (neodymium), Pm (promethium), Sm (samarium), Eu (europium), Gd (gadolinium), Tb (terbium), Dy (dysprosium), Ho (holmium), Er (erbium), Tm (thulium), Yb (ytterbium), or Lu (lutetium). Among them, A is preferably Y, Sc, Ce, Eu, Sm, Gd, Pr, or Nd, and more preferably is Y, Eu, Sm, Gd, or Nd. Further, x is 0 or more to less than 1, preferably 0 or more to 0.5 or less, and more preferably 0 or more to 0.1 or less.

B represents the element included in the Sr site, and is Mg, Ca, or Ba. Preferably, B is Ca or Ba. Further, y is 0 or more to less than 1, preferably 0 or more to 0.5 or less, and more preferably 0 or more to 0.1 or less.

C represents the element included in the Co site, and is Ti, V, Cr, Fe, or Mn, Preferably, C is Mn, Fe, or Cr, and more preferably Mn or Fe. Further, z is 0 or more to less than 1, preferably 0 or more to 0.5 or less, and more preferably 0 or more to 0.1 or less.

δ denotes an oxygen deficiency amount, and an oxygen deficiency of −0.2 or more to 1.5 or less is produced. Specifically, the valency of oxygen in the formula (1) is 8.5 or more to 10.2 or less.

When the layered metal oxide represented by the formula (1) is subjected to a steam treatment, it is inferred that water molecules are hydrolyzed due to an oxygen defect in the layered metal oxide, whereby hydroxide ion conductivity is exhibited. By employing an electrolyte layer that includes this layered metal oxide, a sufficiently high electromotive force can be obtained even at room temperature. The steam treatment can be carried out by, for example, producing the below-described solid electrolyte, then exposing this solid electrolyte to conditions of a predetermined temperature, relative humidity, and pressure. These conditions are preferably set as appropriate within a range in which hydroxide ion conductivity is exhibited. For example, it is preferred to set the temperature within a range of 50 to 120° C., the relative humidity within a range of 50 to 90%, the pressure within a range of 0.1 to 1 MPa, and the treatment time within a range of 2 to 48 hours.

<Production Method of Solid Electrolyte Including Layered Metal Oxide>

The solid electrolyte including the layered metal oxide represented by the formula (1) can be produced by a method that includes the following first step and second step.

[First Step]

In the first step, an aqueous solution containing La, Sr, and Co is added to an aqueous alkali solution. By this step, a precipitate including a precursor of the layered metal oxide represented by the formula (1) can be produced. By using such a co-precipitation method, dispersion properties are increased and a uniform layered metal oxide can be produced without the atoms in the aqueous solution clumping together. Further, pH change can be suppressed. The term "precursor" refers to something that turns into a layered metal oxide by calcining.

The aqueous solution containing La, Sr, and Co may contain a predetermined amount of La, Sr, and Co in an aqueous solution, and an aqueous solution in which La, Sr, and Co salts are dissolved in water is preferred. Examples of the La salt include $La(NO_3)_3$. Examples of the Sr salt include $Sr(NO_3)_2$. Examples of the CO salt include $Co(NO_3)_2$. The content ratio of La, Sr, and Co may be in a range that satisfies the formula (1), and preferred is a ratio in which La:Sr:Co is 1:3:3.

The aqueous alkali solution is not especially limited as long as it has a basic group that can produce a precipitate by adding the aqueous solution containing La, Sr, and Co. For example, ones containing carbonate ions, such as an aqueous $Na_2CO_3$ solution and an aqueous $K_2CO_3$ solution can be preferably used.

As the step of adding the aqueous solution containing La, Sr, and Co to the aqueous alkali solution, it is preferred to add an aqueous solution containing all of the above-described La, Sr, and Co to the above-described aqueous alkali solution in one go. By adding the aqueous solution containing La, Sr, and Co to the aqueous alkali solution in one go, the dispersion properties can be increased, and a precipitate including a uniform layered metal oxide precursor can be obtained.

Further, in the step of adding the aqueous solution containing La, Sr, and Co to the aqueous alkali solution, it is preferred to add the aqueous solution containing La, Sr, and Co to the aqueous alkali solution rapidly, for example, add it to the aqueous alkali solution in 1 to 10 seconds. More preferred is adding in 2 to 5 seconds, and still more preferred is to add all at once in 2 to 3 seconds. By adding the aqueous solution containing La, Sr, and Co to the aqueous alkali solution in a short time, dispersion properties are increased and a precipitate including a uniform layered metal oxide precursor can be produced without the atoms clumping together.

In the first step, it is preferred to have a step of stirring for 1 to 10 hours a mixed solution of the above-described aqueous alkali solution and the aqueous solution containing La, Sr, and Co. More preferred is stirring for 1 to 4 hours, and still more preferred is stirring for 1 to 2 hours. Further, after the stirring, it is preferred to have a step of leaving to stand for 18 to 24 hours. More preferred is leaving to stand for 20 to 22 hours, and still more preferred is leaving to stand for 20 to 21 hours. As a result of the stirring and leaving to stand steps, the precipitate including a precursor of the layered metal oxide represented by the formula (1) can be made a more uniform composition.

[Second Step]

In the second step, a solid electrolyte including the layered metal oxide represented by the formula (1) is formed by calcining the precipitate including the layered metal oxide precursor obtained in the above-described first step. In this second step, before the below-described calcining step, it is preferred to optionally carry out a step of drying (drying step) the precipitate produced in the above-described mixed solution containing moisture and the like after the first step. The drying step can more preferably be carried out by air drying. Further, before this drying step, it is also preferred to carry out a step of washing multiple times the precipitate using water, ethanol and the like.

The dried precipitate is then calcined in a calcining step for 15 to 60 minutes at 600 to 900° C. Consequently, a solid electrolyte in a powder state that includes the layered metal oxide represented by the formula (1) can be obtained. The calcining temperature is preferably 650 to 850° C., and more preferably 700 to 800° C. Further, the calcining time is preferably 20 to 50 minutes, and more preferably 30 to 40 minutes.

<Solid Electrolyte Layer>

The above-obtained solid electrolyte in a powder state can be molded into a solid electrolyte layer by compression-molding and calcining. In that case, first, the solid electrolyte in a powder state that includes the layered metal oxide represented by the formula (1) is made into a preferred shape and thickness. For example, it is preferred to make into a size that matches the fuel cell to be used, and it is preferred to make into a pellet shape having a thickness of 1 to 1.5 mm that is almost circular with a diameter of 18 to 22 mm. To make into a pellet shape, the solid electrolyte in a powder state can be placed in a tablet molding machine, for example, and held for 3 to 5 minutes at a pressure of 30 to 40 MPa.

Next, the solid electrolyte formed into a pellet shape is calcined for 15 to 60 minutes at 900 to 1100° C. Consequently, a solid electrolyte layer (pellet) including the layered metal oxide represented by the formula (1) can be obtained. The calcining temperature is preferably 950 to 1050° C., and more preferably 970 to 1020° C. Further, the calcining time is preferably 20 to 50 minutes, and more preferably 30 to 40 minutes.

Although the layered metal oxide represented by the formula (1) is included in the solid electrolyte layer, oxides other than the layered metal oxide represented by the formula (1) or impurities may also be included, up to a level that does not inhibit the functional expression of the layered metal oxide.

<Fuel Cell>

A fuel cell can be constituted by using the solid electrolyte layer including the layered metal oxide represented by the formula (1), and including the anode electrode on one face thereof, and a cathode electrode on the other face. Although the present fuel cell preferably uses ammonia as a fuel, hydrogen or some other gas can also be used for the fuel.

The anode electrode is not especially limited as long as it includes an electrode catalyst and a layered metal oxide. For example, one can be used in which an Fe—Co—Ni electrode catalyst and a $NaCo_2O_4$ sintered body are mixed at a predetermined ratio, and a paste of the mixture is coated on foamed Ni. Here, from the perspective of obtaining a high electromotive force and sufficient current density, the Fe—Co—Ni electrode catalyst, which is an electrode catalyst, preferably has an alloy material that includes an alloy portion containing Fe, Co, and Ni, and an Fe portion in which the alloy portion is not formed.

Further, as the cathode electrode, one that includes a carbon material and a layered metal oxide can be applied. For example, one in which a $NaCo_2O_4$ sintered body and carbon black are mixed at a predetermined ratio and the mixture is coated on carbon paper can be used.

In the above-described fuel cell, it is preferred to, before generating power, perform a pre-treatment by increasing the temperature of the solid electrolyte layer (pellet) to 250 to 300° C., and flowing hydrogen humidified at room temperature for 15 to 60 minutes at a rate of 5 to 10 ml/min. By doing this, the $OH^-$ ions are conducted more easily through the solid electrolyte layer. Further, although it is also preferred to similarly subject the anode electrode to this pre-treatment, the cathode electrode is preferably not subjected to the same pre-treatment.

To generate power in the above-described fuel cell, ammonia-containing gas is supplied to the anode electrode, and an oxygen-containing gas is supplied to the cathode electrode.

Consequently, the following reactions occur in the fuel cell, thereby generating power.

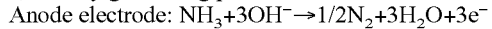
Anode electrode: $NH_3 + 3OH^- \rightarrow 1/2 N_2 + 3H_2O + 3e^-$
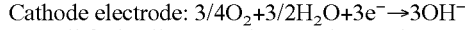
Cathode electrode: $3/4 O_2 + 3/2 H_2O + 3e^- \rightarrow 3OH^-$
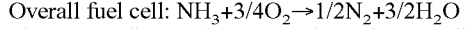
Overall fuel cell: $NH_3 + 3/4 O_2 \rightarrow 1/2 N_2 + 3/2 H_2O$ Thus, according to the present invention, a solid electrolyte, and a production method thereof, which includes the layered metal oxide represented by the formula (1), can be provided. Further, by using this solid electrolyte as a solid electrolyte layer in a fuel cell, a fuel cell in which ammonia is the fuel can be operated at a high electromotive force.

Although a preferred embodiment of the present invention was described above in detail, the present invention is not limited to the above-described embodiment.

Second Embodiment

A preferred second embodiment of the present invention will now be described in more detail while, on occasion, referring to the drawings.

(Fuel Cell)

Figure 5:
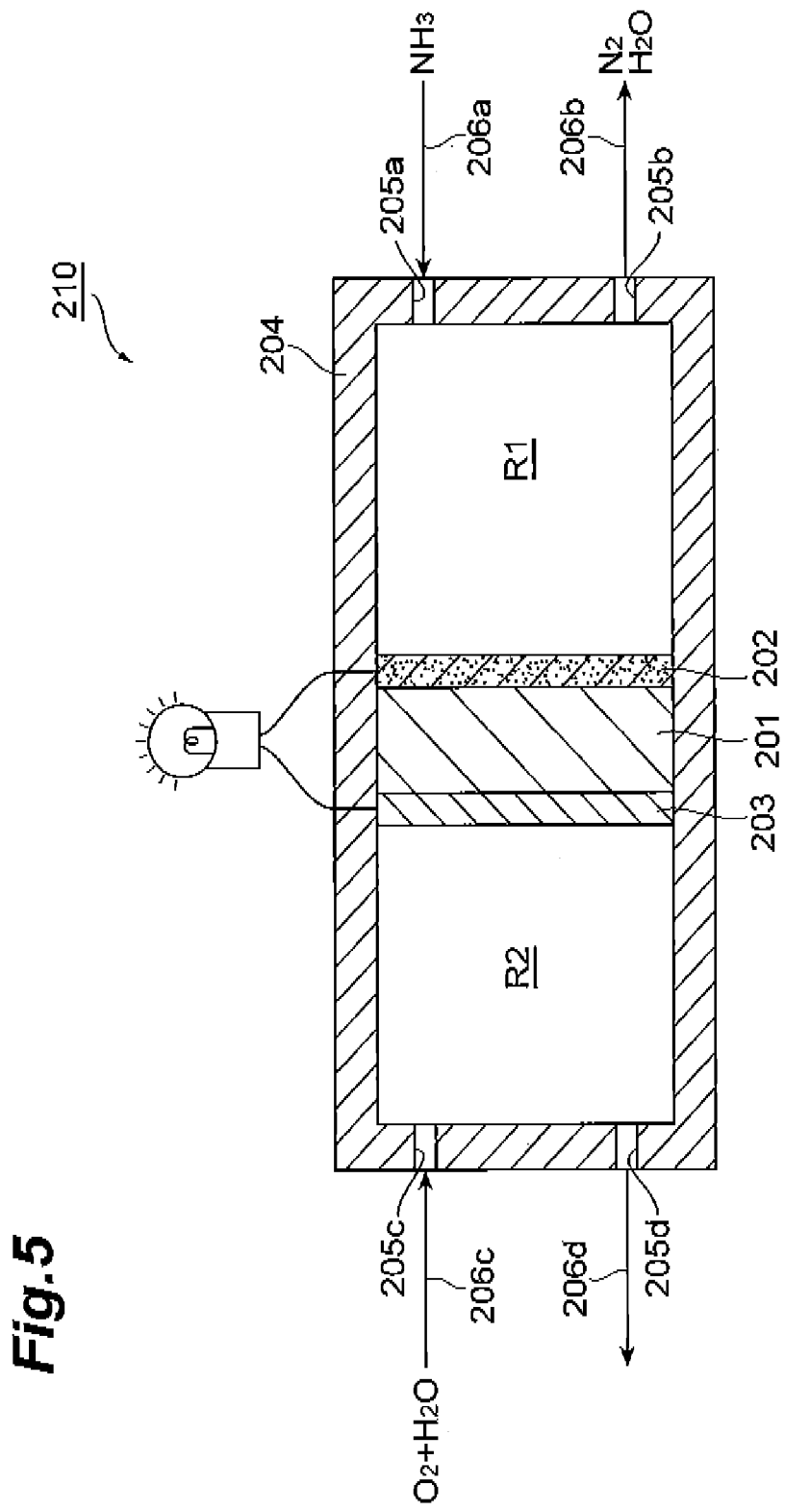
FIG. 5 is a schematic cross-sectional view illustrating a one embodiment of a fuel cell according to the present invention.

FIG. 5 is a schematic cross-sectional view illustrating a preferred embodiment of a fuel cell according to the present invention. A fuel cell 210 in FIG. 5 includes a solid electrolyte layer 201, and an anode electrode 202 and a cathode electrode 203, which are arranged so as to sandwich the solid electrolyte layer 201. In addition, the fuel cell 210 has a cell body part 204, whose internal space is separated into a first region R1 and a second region R2 by the solid electrolyte layer 201.

The cell body part 204 houses the anode electrode 202, the cathode electrode 203, and the solid electrolyte layer 201. The internal space of the cell body part 204 is separated into the first region R1 and the second region R2 by the solid electrolyte layer 201. The cell body part 204 has a gas supply port 205a for supplying, as a fuel of the fuel cell 210, ammonia, for example, into the first region R1, and a gas discharge port 205b for discharging, for example, $N_2$ and $H_2O$ from the first region R1. A pipe 206a and a pipe 206b are connected to the gas supply port 205a and the gas discharge port 205b, respectively. A valve (not illustrated) or the like for regulating the amount of gas to be supplied is provided midway along the pipe 206a. Further, in the present embodiment, the fuel supply means is configured from the gas supply port 205a, the pipe 206a, the valve for gas amount regulation and the like.

Further, the cell body part 204 has a gas supply port 205c for supplying, as an oxidizing agent for the fuel cell 210, for example, oxygen along with moisture into the second region R2, and a gas discharge port 205d for discharging gas from the second region R2. A pipe 206c and a pipe 206e are connected to the gas supply port 205c and the gas discharge port 205d, respectively. A valve (not illustrated) or the like for regulating the amount of gas to be supplied is provided midway along the pipe 206c. Further, in the present embodiment, the oxidizing agent supply means is configured from the gas supply port 205c, the pipe 206c, the valve for gas amount regulation and the like.

A conductor wire is connected to the anode electrode 202 and the cathode electrode 203, respectively, for extracting the power generated by the fuel cell 210. Examples of the conductor wire include copper wire, nichrome wire and platinum wire. The conductor is not limited to these conductors, and may be selected as appropriate based on the operation conditions and the like.

The configuration of the anode electrode 202, the solid electrolyte layer 201, and the cathode electrode 203 in the fuel cell 210 will be described in more detail below.

The anode electrode 202 is provided on the first region R1 side of the solid electrolyte layer 201, and includes an electrode catalyst and a first layered metal oxide. The electrode catalyst is not especially limited, as long as it can be used for a fuel cell anode electrode. From the perspective of achieving a high electromotive force and sufficient current density, it is preferably an electrode catalyst having an alloy material that includes an alloy portion containing Fe, Co, and Ni, and an Fe portion in which the alloy portion is not formed. The phrase "alloy portion containing Fe, Co, and Ni" refers to, for example, a portion in which Fe, Co, and Ni form a ternary alloy. The alloy portion containing Fe, Co, and Ni may also include components such as other metals, within a range that does not harm its function as this alloy portion. Further, the phrase "Fe portion in which the alloy portion is not formed" refers to a portion in which some of the Fe has precipitated from the ternary alloy of Fe, Co, and Ni. This Fe portion in which the alloy portion is not formed exists, for example, outside of the region of the alloy portion containing Fe, Co, and Ni, and one in which Fe has precipitated on the surface of the alloy portion region is also preferred. Although the alloy material includes an alloy portion containing Fe, Co, and Ni and an Fe portion in which the alloy portion is not formed, it may also include components such as other metals, within a range that does not harm its function as the alloy material.

The fact that the alloy material includes an alloy portion containing Fe and an Fe portion in which the alloy portion is not formed can be confirmed if two peaks derived from Fe are exhibited when the alloy material is subjected to structural analysis using X-ray diffraction (diffraction angle 2θ). Specifically, the electrode catalyst according to the present invention exhibits two peaks derived from Fe in a range of 43 to 45° when subjected to structural analysis using X-ray diffraction (diffraction angle 2θ). The two peaks consist of a first peak indicating Fe included in the alloy portion and a second peak indicating an Fe portion in which the alloy portion is not formed. Although the first peak and the second peak may not always be clearly separated into two at their bases, if the highest portions of the two peaks are separated by at least 0.5 to 1°, preferably 0.8 to 1°, and more preferably 0.9 to 1°, it can be considered that two peaks derived from Fe are exhibited. Further, the intensity of the second peak may be 30 to 50% of the intensity of the first peak. This ratio is preferably 35 to 50%, and more preferably 40 to 50%. The present inventors infer that the above structure of the present electrode catalyst enables a high electromotive force and sufficient current density when applied to an ammonia fuel cell.

The above-described electrode catalyst preferably supports the above-described alloy material on a carbon material. Here, a material with a high carbon content is preferred as the carbon material. For example, carbon black may be used.

The above-described electrode catalyst can be prepared by, for example, a step of obtaining a catalyst precursor by impregnating a carbon material with an aqueous solution containing Fe, Co, and Ni, a first calcining step of calcining the catalyst precursor under a hydrogen atmosphere, and a second calcining step of calcining the catalyst precursor that has been calcined in the first calcining step under a hydrogen atmosphere at a lower temperature than in the first calcining step. Bach of these steps will now be described below.

First, in the step of obtaining a catalyst precursor, a catalyst precursor is obtained by impregnating a carbon material with an aqueous solution containing Fe, Co, and Ni. The aqueous solution containing Fe, Co, and Ni may be an aqueous solution that contains Fe, Co, and Ni at a predetermined ratio. An aqueous solution in which Fe, Co, and Ni salts are dissolved in water is preferred. Examples of the Fe salt include $Fe(NO_3)_3 \cdot 9H_2O$. Examples of the Co salt include $Co(NO_3)_2 \cdot 6H_2O$. Examples of the Ni salt include $Ni(NO_3)_2 \cdot 6H_2O$.

The ratio among Fe, Co, and Ni in the aqueous solution containing Fe, Co, and Ni is, based on Fe being 1, preferably Co being 0.3 to 3 and N±0.3 to 3, more preferably Co being 0.5 to 2 and N±0.5 to 2, still more preferably Co being 0.8 to 1.2 and N±0.8 to 1.2, and especially preferably Co being 0.9 to 1.1 and N±0.9 to 1.1. Most preferred is a ratio in which Fe:Co:Ni is 1:1:1.

As the carbon material impregnated with the aqueous solution containing Fe, Co, and Ni, a material with a high carbon content is preferred. For example, carbon black may be used. The amount of carbon black is preferably adjusted so that the catalyst amount is 30 to 80 wt. %, more preferably 40 to 70 wt. %, and still more preferably 50 to 60 wt. %. Further, it is preferred to have a step of evaporating the moisture in the carbon material (catalyst precursor) impregnated with the aqueous solution containing Fe, Co, and Ni, and drying.

Next, in the first calcining step, the catalyst precursor obtained in the above step is calcined in a hydrogen atmosphere. The temperature in the first calcining step is preferably 900 to 1300° C. By calcining at 900 to 1300° C., it is easier to produce the alloy containing Fe, Co, and Ni. The calcining temperature is more preferably 1050 to 1300° C., and especially preferably 1200 to 1300° C. By rapidly calcining at a high temperature of about 1200 to 1300° C., an alloy that is highly dispersed and has a small particle size can be formed.

The calcining time in the first calcining step is preferably 1 to 120 minutes, more preferably 1 to 60 minutes, still more preferably 1 to 30 minutes, especially preferably 1 to 10 minutes, and most preferably 1 to 3 minutes.

Next, in the second calcining step, the catalyst precursor (alloy containing Fe, Co, and Ni) that has been calcined in the first calcining step is further calcined under a hydrogen atmosphere. Here, the temperature in the second calcining step is a lower temperature than in the first calcining step. It is preferably 400 to 800° C. lower than the first calcining temperature, and more preferably is 600 to 700° C. lower. By calcining the alloy containing Fe, Co, and Ni (catalyst precursor that has been calcined in the first calcining step) at a lower temperature than the first calcining temperature, Fe is made to precipitate from the alloy portion, so that it is easier to obtain the alloy material that includes an Fe portion in which the alloy portion is not formed. More specifically, the temperature in the second calcining step is preferably 400 to 600° C. This calcining temperature is more preferably 450 to 550° C., and still more preferably 480 to 520° C. Rather than the temperature difference with the first calcining temperature, what is much more important is that the second calcining temperature is around 500° C., which makes it easier for the Fe to precipitate from the alloy portion.

The calcining time in the second calcining step is preferably 0.1 to 10 hours, more preferably 0.5 to 5 hours, still more preferably 1 to 5 hours, especially preferably 1 to 4 hours, and most preferably 1 to 3 hours.

Thus, a structure not seen in conventional Fe—Co—Ni catalysts, in which some Fe (Fe portion in which the alloy portion is not formed) has precipitated from the alloy portion containing Fe, Co, and Ni, can be easily exhibited by calcining the catalyst precursor over two separate steps, especially by calcining with a temperature in the second calcining step that is lower than in the first calcining step.

Further, in the above-described first calcining step or second calcining step, the alloy material including an alloy portion containing Fe, Co, and Ni and an Fe portion in which the alloy portion is not formed, can also be produced by, for example, after formation of the alloy portion in the first calcining step, further adding Fe and calcining.

The first layered metal oxide included in the anode electrode 202 is not especially limited, as long as it exhibits hydroxide ion conductivity by a steam treatment, and can be used as the anode electrode. The content of the first layered oxide is, based on 100 parts by weight of the electrode catalyst, 50 to 150 parts by weight. If the first layered oxide is less than 50 parts by weight based on 100 parts by weight of the electrode catalyst, or is more than 150 parts by weight, when used as the anode electrode in the fuel cell, the current density is insufficient. Preferably, the first layered oxide is, based on 100 parts by weight of the electrode catalyst, 60 to 140 parts by weight, and more preferably 70 to 130 parts by weight.

The cathode electrode 203 is provided on the second region R2 side of the solid electrolyte layer 201, and includes a carbon material and a second layered metal oxide, As the carbon material, a material with a high carbon content is preferred. For example, carbon black may be applied. The second layered metal oxide is not especially limited, as long as it is not subjected to a steam treatment, and can be used as a cathode electrode in a fuel cell. The content of the second layered oxide is, based on 100 parts by weight of the carbon material, 150 to 250 parts by weight. If the second layered oxide is less than 150 parts by weight based on 100 parts by weight of the carbon material, or is more than 250 parts by weight, when used as the cathode electrode in the fuel cell, voltage decreases and the current density is insufficient. Preferably, the second layered oxide is, based on 100 pails by weight of the carbon material, 180 to 250 parts by weight, and more preferably 200 to 250 parts by weight.

Although the anode electrode 202 may be provided directly on the first region R1 side of the solid electrolyte layer 201, and the cathode electrode 203 may be provided directly on the second region R2 side of the solid electrolyte layer 201, they may also be formed on a carrier. Materials to serve as the carrier are not especially limited, as long as they are porous and have conductivity and a microstructure. For example, foamed Ni, carbon paper, carbon cloth, and stainless steel mesh can be used.

The solid electrolyte layer 201 is arranged between the anode electrode 202 and the cathode electrode 203, and includes a third layered metal oxide. The third layered metal oxide is not especially limited, as long as it exhibits hydroxide ion conductivity by a steam treatment, and can be used as a solid electrolyte layer in a fuel cell.

From the perspective of achieving high ion conductivity, the solid electrolyte layer 201 preferably has as little voids as possible in the solid electrolyte layer 201. Although the thickness of the solid electrolyte layer 201 may be appropriately set based on the fuel cell application and operating conditions, it is preferably 0.3 to 3 mm, more preferably 0.5 to 2 mm, still more preferably 0.5 to 1.5 mm, and especially preferably 0.8 to 1.2 mm. If the thickness of the solid electrolyte layer 201 is less than 0.3 mm, the strength of the solid electrolyte layer 201 tends to be insufficient, so that it is necessary to use an anode support disc. On the other hand, if the thickness of the solid electrolyte layer 201 is more than 3 mm, internal resistance tends to increase.

The first, second, and third layered metal oxides included in the anode electrode 202, the cathode electrode 203, and the solid electrolyte layer 201 may each be the same or different. From the perspective of achieving a high electromotive force and sufficient current density, the first, second, and third layered metal oxides preferably are a layered metal oxide represented by the formula (1) or NaCo$_2$O$_4$,

  (1)

[wherein A represents a rare earth element other than La; B represents Mg, Ca, or Ba; C represents Ti, V, Cr, or Mn; $0 \leq x<1, 0 \leq y<1, 0 \leq z<1$; and $\delta$ represents an oxygen deficiency amount].

In the layered metal oxide represented by the formula (1), in the formula (1), A represents the element included in the La site, and is preferably a rare earth element other than La (lanthanum). Rare earth elements other than La (lanthanum) are Sc (scandium), Y (yttrium), Ce (cerium), Pr (praseodymium), Nd (neodymium), Pm (promethium), Sm (samarium), Eu (europium), Gd (gadolinium), Tb (terbium), Dy (dysprosium), Ho (holmium), Er (erbium), Tm (thulium), Yb (ytterbium), or Lu (lutetium). Among them, more preferably A is Y, Sc, Ce, Eu, Sm, Gd, Pr, or Nd, and still more preferably is Y, Eu, Sm, Gd, or Nd. Further, x is preferably 0 or more to less than 1, more preferably 0 or more to 0.5 or less, and still more preferably 0 or more to 0.1 or less.

B represents the element included in the Sr site, is preferably Mg, Ca, or Ba, and more preferably is Ca or Ba. Further, y is preferably 0 or more to less than 1, more preferably 0 or more to 0.5 or less, and still more preferably 0 or more to 0.1 or less.

C represents the element included in the Co site, is preferably Ti, V, Cr, Fe, or Mn, more preferably Mn, Fe, or Cr, and still more preferably Mn or Fe. Further, z is preferably 0 or more to less than 1, more preferably 0 or more to 0.5 or less, and still more preferably 0 or more to 0.1 or less.

$\delta$ denotes an oxygen deficiency amount, and an oxygen deficiency of −0.2 or more to 1.5 or less is produced. Specifically, the valency of oxygen in the formula (1) is 8.5 or more to 10.2 or less.

When the layered metal oxide represented by the formula (1) is subjected to a steam treatment, it is inferred that water molecules are hydrolyzed due to an oxygen defect in the layered metal oxide, whereby hydroxide ion, conductivity is exhibited. Here, the first layered metal oxide included in the anode electrode 202 and the third layered metal oxide included in the solid electrolyte layer 201 are subjected to a steam treatment. By employing the anode electrode 202 that includes the first layered metal oxide and the solid electrolyte layer 201 that includes the third layered metal oxide, which are subjected to a steam treatment, in the fuel cell, a sufficiently high electromotive force can be obtained even at room temperature.

The steam treatment can be carried out by exposing the solid electrolyte layer 201 and the anode electrode 202 to conditions of a predetermined temperature, relative humidity, and pressure. These conditions are preferably set as appropriate within a range in which hydroxide ion conductivity is exhibited. For example, it is preferred to set the temperature within a range of 50 to 120° C., the relative humidity within a range of 50 to 90%, the pressure within a range of 0.1 to 1 MPa, and the treatment time within a range of 2 to 48 hours. If the steam treatment temperature is too high, the above-described electrolyte layer and electrode become brittle, so that the performance may deteriorate.

Since the above-described layered metal oxide has a high density, it is excellent also from the perspective of being less susceptible to gas leaks even when ammonia is used as the fuel, for example. Further, hydrogen and hydrogen-containing compounds, such as ethylene glycol and methanol, can be used as the fuel.

To obtain the layered metal oxide represented by the formula (1), for example, a precipitate including a precursor of the layered metal oxide represented by the formula (1) is produced by a step of adding an aqueous solution that includes La, Sr, and Co at a predetermined ratio to an aqueous alkali solution. The layered metal oxide represented by the formula (1) can be obtained by a step of drying this precipitate and calcining at 600 to 900° C. for 15 to 60 minutes.

On the other hand, to obtain the NaCo$_2$O$_4$, for example, a solution in which sodium acetate and cobalt acetate tetrahydrate are dissolved at a predetermined ratio is dried, and the obtained sample is pulverized and calcined. The calcined sample is pulverized, and then, in a molded pellet state, again calcined at a temperature of about 750 to 850° C. Then, the calcined pellet is pulverized and pelletized, and sintered at a temperature of about 900 to 1000° C., whereby NaCo$_2$O$_4$ having a layered crystal structure is obtained.

(Power Generation Method)

Next, the power generation method using the fuel cell 210 will be described. To exhibit hydroxide ion conductivity, prior to starting power generation with the fuel cell 210, the stream treatment of the layered metal oxides (preferably a layered metal oxide represented by the formula (1) or NaCo$_2$O$_4$) forming the solid electrolyte layer 201 and the anode electrode 202 is carried out. By steam treating the layered metal oxides constituting the solid electrolyte layer 201 and the anode electrode 202, water molecules are hydrolyzed due to an oxygen defect in the layered metal oxides. Consequently, hydroxide ion conductivity is exhibited. The fuel cell 210, when ammonia is used as the fuel for example, is classified as an anion-exchange fuel cell, in which hydroxide ions (OH$^-$) are the ion conductors in the fuel cell.

The steam treatment of the solid electrolyte layer 201 and the anode electrode 202 can be carried out by, for example, adjusting the inside of the cell body part 204 (the first region R1 and the second region R2) to a predetermined temperature, relative humidity, and pressure. During this process, measures are taken so that the cathode electrode 203 is not steam treated. Although the steam treatment conditions are not especially limited as long as hydroxide ion conductivity is exhibited, from perspectives such as operational efficiency of the steam treatment and conductivity after the steam treatment, the following conditions are preferred. Specifically, the temperature in the steam treatment is preferably 20 to 150° C., more preferably 40 to 130° C., and still more preferably 50 to 120° C. The relative humidity in the steam treatment is preferably 30 to 100%, more preferably 40 to 90%, and still more preferably 50 to 90%. The pressure in the steam treatment is preferably 0.1 to 1 MPa, more preferably 0.1 to 0.8 MPa, and still more preferably 0.2 to 0.5 MPa. The treatment time of the steam treatment is preferably 2 to 48 hours, and more preferably 3 to 24 hours.

It is preferred that the solid electrolyte layer 201 and the anode electrode 202 are subjected to a hydrogen treatment before, or simultaneously with, the steam treatment. The hydrogen treatment can be carried out by, for example, supplying hydrogen in a state in which the inside of the first region R1 of the cell body part 204 is adjusted at a predetermined temperature and pressure. Although the hydrogen treatment conditions are not especially limited as long as the electrode catalyst of the anode electrode 202 exhibits a sufficiently high catalytic activity, from perspectives such as operational efficiency of the hydrogen treatment and catalytic activity after the hydrogen treatment, the following conditions are preferred. Specifically, the temperature in the hydrogen treatment is preferably 200 to 400° C., and more preferably 100 to 350° C. The pressure in the hydrogen treatment is preferably 0.1 to 1 MPa, and more preferably 0.1 to 0.8 MPa. The hydrogen concentration in the hydrogen treatment is preferably 10 to 100 vol. %, and more preferably 20 to 80 vol. %. The treatment time of the hydrogen treatment is preferably 2 to 48 hours, and more preferably 3 to 24 hours.

After performing the steam treatment, the reaction represented by the formula (2) proceeds at the anode electrode 202 by supplying, for example, an ammonia-containing gas as a fuel of the fuel cell 210 to the first region R1. On the other hand, the reaction represented by the formula (3) proceeds at the cathode electrode 203 by supplying, for example, a gas containing $O_2$ and $H_2O$ as an oxidizing agent for the fuel cell 210 to the second region R2. The gas supplied to the second region R2 may contain oxygen and moisture, and humidified oxygen and humidified air can be used.

$$NH_3 + 3OH^- \rightarrow 1/2 N_2 + 3H_2O + 3e^- \quad (2)$$

$$3/4 O_2 + 3/2 H_2O + 3e^- \rightarrow 3OH^- \quad (3)$$

The fuel cell 210 with the above-described configuration has an operating temperature of 10 to 800° C., which is a wide range. Therefore, according to such a fuel cell 210, power generation at a comparatively low temperature conditions, for example, 20 to 80° C., can be sufficiently carried out.

As stated above, the fuel cell according to the present invention includes an anode electrode, which includes an electrode catalyst and a first layered metal oxide, in which the first layered oxide is 50 to 150 parts by weight based on 100 parts by weight of the electrode catalyst, a cathode electrode, which includes a carbon material and a second layered metal oxide, in which the second layered oxide is 150 to 250 parts by weight based on 100 parts by weight of the carbon material, and a solid electrolyte layer, which is arranged between the anode electrode and the cathode electrode and includes a third layered metal oxide, wherein the first and third layered metal oxides having been subjected to a steam treatment, whereby the fuel cell can obtain a high electromotive force and sufficient current density.

Third Embodiment

A preferred third embodiment of the present invention will now be described in more detail while, on occasion, referring to the drawings.

Electrode Catalyst Including Fe, Co, and Ni>

The electrode catalyst according to the present invention has an alloy material that includes an alloy portion containing Fe, Co, and Ni, and an Fe portion in which the alloy portion is not formed. The phrase "alloy portion containing Fe, Co, and Ni" refers to, for example, a portion in which Fe, Co, and Ni form a ternary alloy. The alloy portion containing Fe, Co, and Ni may also include components such as other metals, within a range that does not harm its function as this alloy portion. Further, the phrase "Fe portion in which the alloy portion is not formed" refers to a portion in which some of the Fe has precipitated from the ternary alloy of Fe, Co, and Ni. This Fe portion in which the alloy portion is not formed exists, for example, outside of the region of the alloy portion containing Fe, Co, and Ni, and one in which an Fe portion has precipitated on the surface of the alloy portion region is also preferred. Although the alloy material includes an alloy portion containing Fe, Co, and Ni and an Fe portion in which the alloy portion is not formed, it may also include components such as other metals, within a range that does not harm its function as the alloy material.

The fact that the alloy material includes an alloy portion containing Fe and an Fe portion in which the alloy is not formed can be confirmed if two peaks derived from Fe are exhibited when the alloy material is subjected to structural analysis using X-ray diffraction (diffraction angle 2θ). Specifically, the electrode catalyst according to the present invention exhibits two peaks derived from Fe in a range of 43 to 45° when subjected to structural analysis using X-ray diffraction (diffraction angle 2θ). The two peaks consist of a first peak indicating Fe included in the alloy portion and a second peak indicating an Fe portion in which the alloy portion is not formed. Although the first peak and the second peak may not always be clearly separated into two at their bases, if the highest portions of the two peaks are separated by at least 0.5 to 1°, preferably 0.8 to 1°, and more preferably 0.9 to 1°, it can be considered that two peaks derived from Fe are exhibited. Further, the intensity of the second peak may be 30 to 50% of the intensity of the first peak. This ratio is preferably 35 to 50%, and more preferably 40 to 50%. The present inventors infer that the above structure of the present electrode catalyst enables a high electromotive force and sufficient current density when applied to an ammonia fuel cell.

The above-described electrode catalyst preferably supports the above-described alloy material on a carbon material. Here, a material with a high carbon content is preferred as the carbon material. For example, carbon black may be used.

<Method for Producing Electrode Catalyst Including Fe, Co, and Ni>

The electrode catalyst according to the present invention can be produced by a step of obtaining a catalyst precursor, a first calcining step, and a second calcining step.

[Step of Obtaining a Catalyst Precursor]

In this step, a catalyst precursor is obtained by impregnating a carbon material with an aqueous solution containing Fe, Co, and Ni. The aqueous solution containing Fe, Co, and Ni may be an aqueous solution that contains Fe, Co, and Ni in a predetermined ratio. An aqueous solution in which Fe, Co, and Ni salts are dissolved in water is preferred. Examples of the Fe salt include $Fe(NO_3)_3 \cdot 9H_2O$. Examples of the Co salt include $Co(NO_3)_2 \cdot 6H_2O$. Examples of the Ni salt include $Ni(NO_3)_2 \cdot 6H_2O$.

The ratio among Fe, Co, and Ni in the aqueous solution containing Fe, Co, and Ni is, based on Fe being 1, preferably Co being 0.3 to 3 and N±0.3 to 3, more preferably Co being 0.5 to 2 and N±0.5 to 2, still more preferably Co being 0.8 to 1.2 and N±0.8 to 1.2, and especially preferably Co being 0.9 to 1.1 and N±0.9 to 1.1. Most preferred is a ratio in which Fe:Co:Ni is 1:1:1.

As the carbon material impregnated with the aqueous solution containing Fe, Co, and Ni, a material with a high carbon content is preferred. For example, carbon black may be used. The amount of carbon black is preferably adjusted so that the catalyst amount is 30 to 80 wt. %, more preferably 40 to 70 wt. %, and still more preferably 50 to 60 wt. %. Further, it is preferred to have a step of evaporating the moisture in the carbon material (catalyst precursor) impregnated with the aqueous solution containing Fe, Co, and Ni, and drying.

[First Calcining Step]

In the first calcining step, the catalyst precursor obtained in the above step is calcined in a hydrogen atmosphere. The temperature in the first calcining step is preferably 900 to 1300° C. By calcining at 900 to 1300° C., it is easier to produce the alloy containing Fe, Co, and Ni. The calcining temperature is more preferably 1050 to 1300° C., and especially preferably 1200 to 1300° C. By rapidly calcining at a high temperature of about 1200 to 1300° C., an alloy that is highly dispersed and has a small particle size can be formed.

The calcining time in the first calcining step is preferably 1 to 120 minutes, more preferably 1 to 60 minutes, still more preferably 1 to 30 minutes, especially preferably 1 to 10 minutes, and most preferably 1 to 3 minutes.

[Second Calcining Step]

In the second calcining step, the catalyst precursor (alloy containing Fe, Co, and Ni) that has been calcined in the first calcining step is further calcined under a hydrogen atmosphere. Here, the temperature in the second calcining step is a lower temperature than in the first calcining step. It is preferably 400 to 800° C. lower than the first calcining temperature, and more preferably 600 to 700° C. lower. Still more preferably it is about 500° C. By calcining the alloy containing Fe, Co, and Ni (catalyst precursor that has been calcined in the first calcining step) at a lower temperature than the first calcining temperature, Fe is made to precipitate from the alloy portion, so that it is easier to obtain the alloy material that includes an Fe portion in which the alloy portion is not formed. More specifically, the temperature in the second calcining step is preferably 400 to 600° C. This calcining temperature is more preferably 450 to 550° C., and still more preferably 480 to 520° C. Especially, by calcining at around 500° C., the Fe can precipitate more easily from the alloy portion.

The calcining time in the second calcining step is preferably 0.1 to 10 hours, more preferably 0.5 to 5 hours, still more preferably 1 to 5 hours, especially preferably 1 to 4 hours, and most preferably 1 to 3 hours.

Thus, a structure not seen in conventional Fe—Co—Ni catalysts, in which some Fe (Fe portion in which the alloy portion is not formed) has precipitated from the alloy portion containing Fe, Co, and Ni, can be easily exhibited by calcining the catalyst precursor over two separate steps, especially by calcining with a temperature in the second calcining step that is lower than in the first calcining step.

Further, in the above-described first calcining step or second calcining step, the alloy material including an alloy portion containing Fe, Co, and Ni and an Fe portion in which the alloy portion is not formed, can also be produced by, for example, after formation of the alloy portion in the first calcining step, further adding Fe and calcining.

<Fuel Cell>

An ammonia fuel cell can be constituted by using the electrode catalyst according to the present invention for the anode electrode, and including this anode electrode on one face of a solid electrolyte layer, and a cathode electrode on the other face.

Although the anode electrode is not especially limited as long as it includes the present electrode catalyst and can be used for an ammonia fuel cell, one that includes the present electrode catalyst and a layered metal oxide is preferred, and one in which the Fe—Co—Ni electrode catalyst according to the present invention and, for example, a $NaCo_2O_4$ sintered body are mixed at a predetermined ratio, and a paste of the mixture is coated on foamed Ni is more preferably used.

As described in the above-described International Publication No. 2010/007949, the $NaCo_2O_4$ sintered body having a layered crystal structure can be obtained by drying a solution in which sodium acetate and cobalt acetate tetrahydrate are dissolved at a predetermined ratio, pulverizing and calcining the obtained sample, pulverizing the calcined sample, then in a molded pellet state, again calcining at a temperature of about 750 to 850° C., then pulverizing and pelletizing the calcined pellet, and sintering at a temperature of about 900 to 1000° C.

Although the solid electrolyte layer is not especially limited as long as off ions can be conducted, it is preferred to use one in which a solid electrolyte including the layered metal oxide represented by the formula (1) or $NaCo_2O_4$ is molded into a pellet shape,

$$(La_{1-x}A_x)(Sr_{1-y}B_y)_3(Co_{1-z}C_z)_3O_{10-\delta} \quad (1)$$

[wherein, A represents a rare earth element other than La; B represents Mg, Ca, or Ba; C represents Ti, V, Cr, or Mn; $0 \le x < 1$, $0 \le y < 1$, $0 \le z < 1$; and $\delta$ represents an oxygen deficiency amount].

In the formula (1), A represents the element included in the La site, and is a rare earth element other than La (lanthanum). Examples of A include Sc (scandium), Y (yttrium), Ce (cerium), Pr (praseodymium), Nd (neodymium), Pm (promethium), Sm (samarium), Eu (europium), Gd (gadolinium), Tb (terbium), Dy (dysprosium), Ho (holmium), Er (erbium), Tm (thulium), Yb (ytterbium), or Lu (lutetium). Among them, A is preferably Y, Sc, Ce, Eu, Sm, Gd, Pr, or Nd, and more preferably is Y, Eu, Sm, Gd, or Nd. Further, x is 0 or more to less than 1, preferably 0 or more to 0.5 or less, and more preferably 0 or more to 0.1 or less.

B represents the element included in the Sr site, and is Mg, Ca, or Ba. Preferably, B is Ca or Ba. Further, y is 0 or more to less than 1, preferably 0 or more to 0.5 or less, and more preferably 0 or more to 0.1 or less.

C represents the element included in the Co site, and is Ti, V, Cr, Fe, or Mn. Preferably, C is Mn, Fe, or Cr, and more preferably Mn or Fe. Further, z is 0 or more to less than 1, preferably 0 or more to 0.5 or less, and more preferably 0 or more to 0.1 or less.

$\delta$ denotes an oxygen deficiency amount, and an oxygen deficiency of −0.2 or more to 1.5 or less is produced. Specifically, the valency of oxygen in the formula (1) is 8.5 or more to 10.2 or less.

When the layered metal oxide represented by the formula (1) is subjected to a steam treatment, it is inferred that water molecules are hydrolyzed due to an oxygen defect in the layered metal oxide, whereby hydroxide ion conductivity is exhibited. By employing an electrolyte layer that includes this layered metal oxide, a sufficiently high electromotive force can be obtained even at room temperature. The steam treatment can be carried out by, for example, producing the below-described solid electrolyte, then exposing this solid electrolyte to conditions of a predetermined temperature, relative humidity, and pressure. These conditions are preferably set as appropriate within a range in which hydroxide ion conductivity is exhibited. For example, it is preferred to set the temperature within a range of 50 to 120° C., the relative humidity within a range of 50 to 90%, the pressure within a range of 0.1 to 1 MPa, and the treatment time within a range of 2 to 48 hours.

Although the cathode electrode is not especially limited as long as it can be used in an ammonia fuel cell, a cathode electrode that includes a carbon material and a layered metal oxide is preferred. For example, a cathode electrode in which a $NaCo_2O_4$ sintered body and carbon black are mixed at a predetermined ratio and the mixture is coated on carbon paper can be used.

In the above-described fuel cell, it is preferred to, before generating power, perform a pre-treatment by increasing the temperature of the solid electrolyte layer to 250 to 300° C., and flowing hydrogen humidified at room temperature for 15 to 60 minutes at a rate of 5 to 10 ml/min. By doing this, the $OH^-$ ions are conducted more easily through the solid electrolyte layer. Further, although it is also preferred to similarly subject the anode electrode to this pre-treatment, the cathode electrode is preferably not subjected to the same pre-treatment.

To generate power in the above-described fuel cell, it is preferred to supply ammonia-containing gas to the anode electrode, and supply a gas containing humidified oxygen to the cathode electrode. Consequently, the following reactions occur in the ammonia fuel cell, thereby generating power.

Anode electrode: $NH_3 + 3OH^- \rightarrow 1/2 N_2 + 3H_2O + 3e^-$
Cathode electrode: $3/4 O_2 + 3/2 H_2O + 3e^- \rightarrow 3OH^-$
Overall ammonia fuel cell: $NH_3 + 3/4 O_2 \rightarrow 1/2 N_2 + 3/2 H_2O$ Thus, according to the present invention, an electrode catalyst, and a production method thereof, which has an alloy material that includes an alloy portion containing Fe, Co, and Ni, and an Fe portion in which this alloy portion is not formed, can be provided. Further, by using this electrode catalyst for an anode electrode in a fuel cell, a fuel cell in which ammonia is the fuel can be operated at a high electromotive force and at a sufficient current density.

Although an embodiment of the present invention was described above in detail, the present invention is not limited to the above-described embodiment. For example, the electrode catalyst including Fe, Co, and Ni according to the present invention can be used not only as a catalyst for a fuel cell, but also in other reactions and syntheses, and can, for example, be used in ammonia synthesis.

EXAMPLES

Although the present invention will now be described using Examples, the present invention is not limited to these Examples.

Example 101

Preparation of Layered Metal Oxide

First, an aqueous solution containing metal salts was prepared by dissolving 1.759 g of $La(NO_3)_3 \cdot 6H_2O$, 2.580 g of $Sr(NO_3)_2$, and 3.548 g of $Co(NO_3)_2 \cdot 6H_2O$ in 100 ml of distilled water so that La:Sr:Co was 1:3:3. Next, as an aqueous alkali solution, an aqueous $Na_2CO_3$ solution ($Na_2CO_3 = 0.14$ mol, $CO_3^{2-}/M = 5$) in which 15 g of $Na_2CO_3$ was dissolved in 100 ml of water was prepared. As a co-precipitation method, the aqueous solution containing the metal salts was added while stirring the aqueous $Na_2CO_3$ solution. During this step, the aqueous solution containing metal salts was added to the aqueous $Na_2CO_3$ solution in one go in 2 to 3 seconds, stirred for 1 hour, and then left to stand for 20 hours.

After leaving to stand for 20 hours, the precipitate that had formed in the aqueous mixture was washed 5 times with water and 3 times with ethanol using a centrifugal separator (trade name: Tabletop Centrifuge 5420, manufactured by Kubota Corporation). The washed precipitate was dried overnight in air (air dried). The dried powder was calcined for 30 minutes at 800° C. (rate of temperature increase: 10 K/min). The calcined powder was molded into a pellet shape 20 mm in diameter and 1 mm thick (pressure: 60 MPa, retention time: 10 minutes), and then calcined for 30 minutes at 1000° C. to obtain a pallet A (rate of temperature increase: 10 K/min).

<Structural Analysis of Pellet A>

Pellet A was subjected to structural analysis using a powder X-ray diffractometer (Rigaku, RINT-Ultima+). The measurement conditions were as follows:
Radiation source: $CuK\alpha$,
Wavelength $\lambda$: 0.154056 nm,
Tube voltage: 40 kV,
Current: 20 mA,
Measurement range $2\theta$: 2 to 80°,
Scanning axis: $2\theta/\theta$,
Scan step: 0.02°,
Scan speed: 2°/min,
Divergence slit: ½°,
Scattering slit: ½°,
Receiving slit: 0.15 mm.

An XRD pattern of this pellet A is illustrated in FIG. 1. It could be confirmed from the obtained diffraction lines that there are many crystal structure planes in the $LaSr_3Co_3O_{10}$ layered metal oxide.

Comparative Example 101

Although Example 101 prepared a layered metal compound using a co-precipitation method, in Comparative Example 101, a solid-phase method was used. First, 3.26 g of $La_2O_3$, 8.86 g of $SrCO_3$, and 6.88 g of $Co_3O_4$ were placed in a planetary ball mill (FRITSCH pulverisette) so that La:Sr:Co was 1:3:3. The mixture was pulverized and mixed under conditions of a rotational speed of 300 rpm and a treatment time of 1 hour. The resultant mixture was placed in a tablet molding machine, molded into a pellet shape (pressure: 20 MPa, retention time: 5 minutes), and then calcined for 3 hours at 1400° C. in a muffle furnace to obtain a pallet B.

<Structural Analysis of Pellet B>

Figure 2:
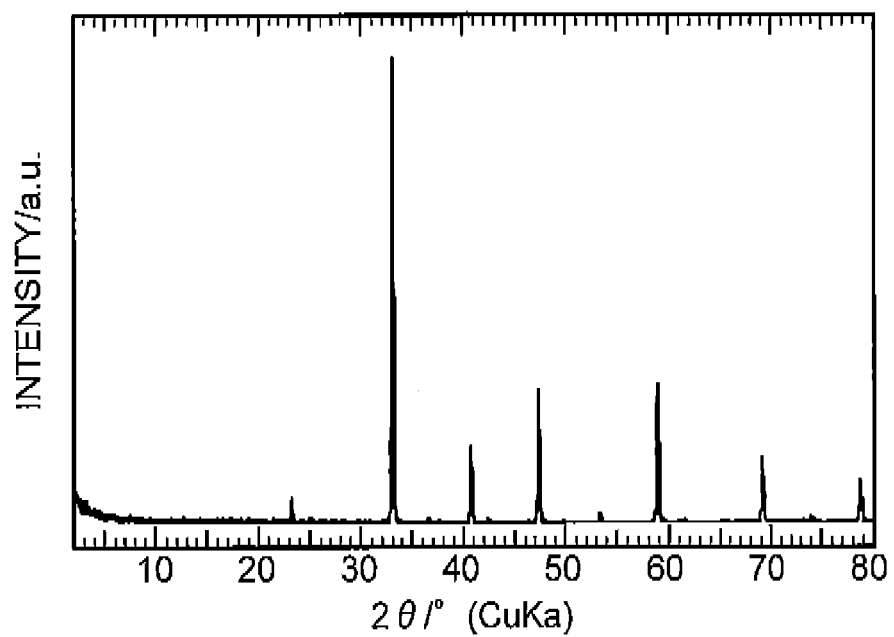
FIG. 2 is a diffraction pattern illustrating the results of structural analysis of pellet B of Comparative Example 101 by X-ray diffraction (XRD)

Pellet B was subjected to structural analysis with the same apparatus and under the same measurement conditions as for the above-described pellet A. An XRD pattern of this pellet B is illustrated in FIG. 2. As illustrated in FIG. 2, the obtained diffraction line belongs to $(La, Sr)CoO_3$, which is a simple perovskite phase, thus indicating that pellet B is not a layered metal oxide ($LaSr_3Co_3O_{10}$).

Example 102

<Power Generation Test>

Figure 3:
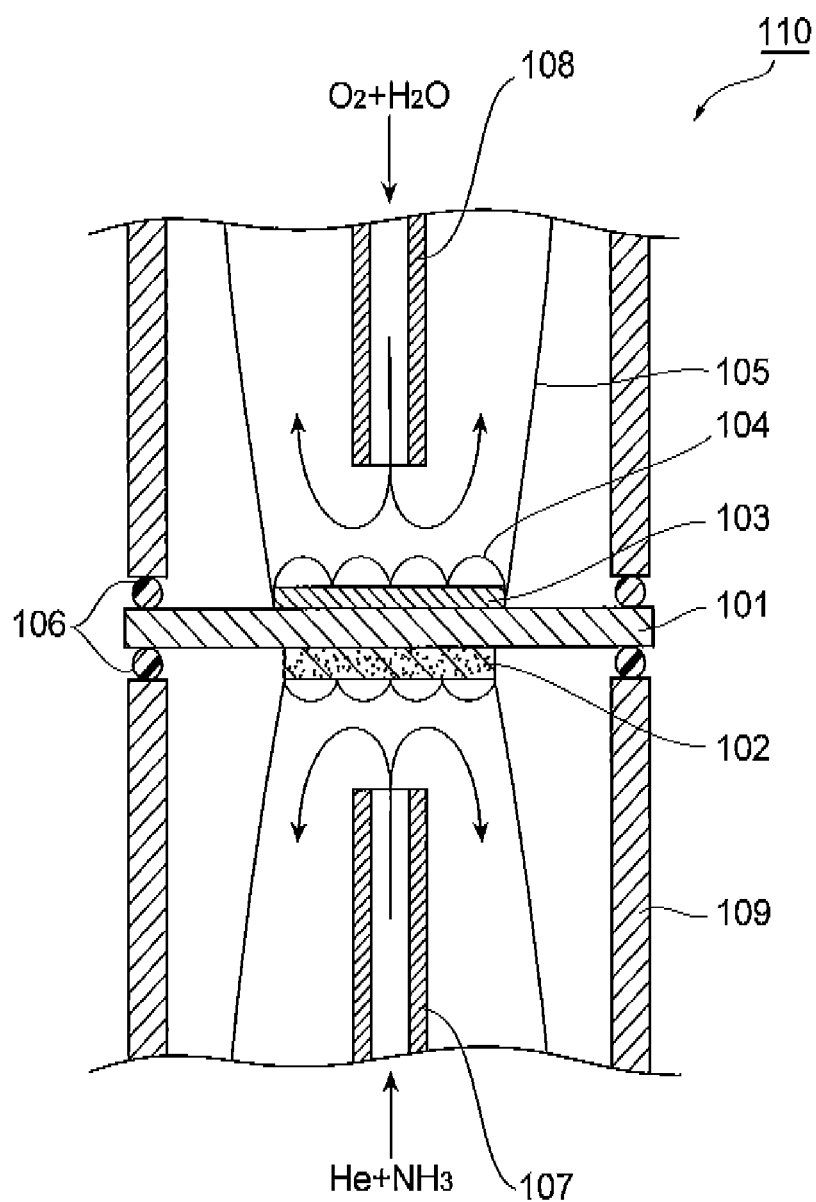
FIG. 3 is a schematic cross-sectional view illustrating an evaluation device (fuel cell) in which pellet A ($LaSr_3Co_3O_{10}$) of Example 101 is used as a solid electrolyte.

In order to evaluate the performance of pellet A obtained in Example 101 as a solid electrolyte layer for a fuel cell, the evaluation device (fuel cell) illustrated in FIG. 3 was prepared. In a fuel cell 110, pellet A ($LaSr_3Co_3O_{10}$) was used as a solid electrolyte layer 101, an Fe—Co—Ni/C catalyst and $NaCo_2O_4$ pulverized and mixed and then coated in a paste was used as an anode electrode 102, and carbon black and $NaCo_2O_4$ coated on a carbon paper was used as a cathode electrode 103. Further, in this fuel cell, a Pt mesh 104 was arranged on the face of the anode electrode 102 and the cathode electrode 103. The output from a conductor wire 105 (Pt wire) connected to this Pt mesh, 104 was measured. In addition, a fuel gas supply port 107 was provided on the anode electrode 102 side, and an oxygen gas supply port 108 was provided on the cathode electrode 103 side. Still further, so that gas did not leak from the fuel cell 110, a cell body part 109 was arranged on the outside of the ports, and a gasket 106 was arranged between the cell body part 109 and the solid electrolyte layer 101.

Measurement was carried out according to the following procedures.

(1) A 1 mm-thick pellet A was pre-treated by increasing the temperature to 280° C., and flowing hydrogen humidified at room temperature for 30 minutes at 5 ml/min.
(2) A foamed Ni (anode electrode 102) having the Fe—Co—Ni/C catalyst and $NaCo_2O_4$ on its face was pre-treated by increasing the temperature to 280° C., and flowing hydrogen humidified at room temperature for 30 minutes at 5 ml/min.
(3) A mixed gas of ammonia and He was supplied to the anode electrode 102 at 20 ml/min, and oxygen humidified at 95° C. was supplied to the cathode electrode 103 at 20 ml/min.
(4) The cell temperature was 73° C.

Figure 4:
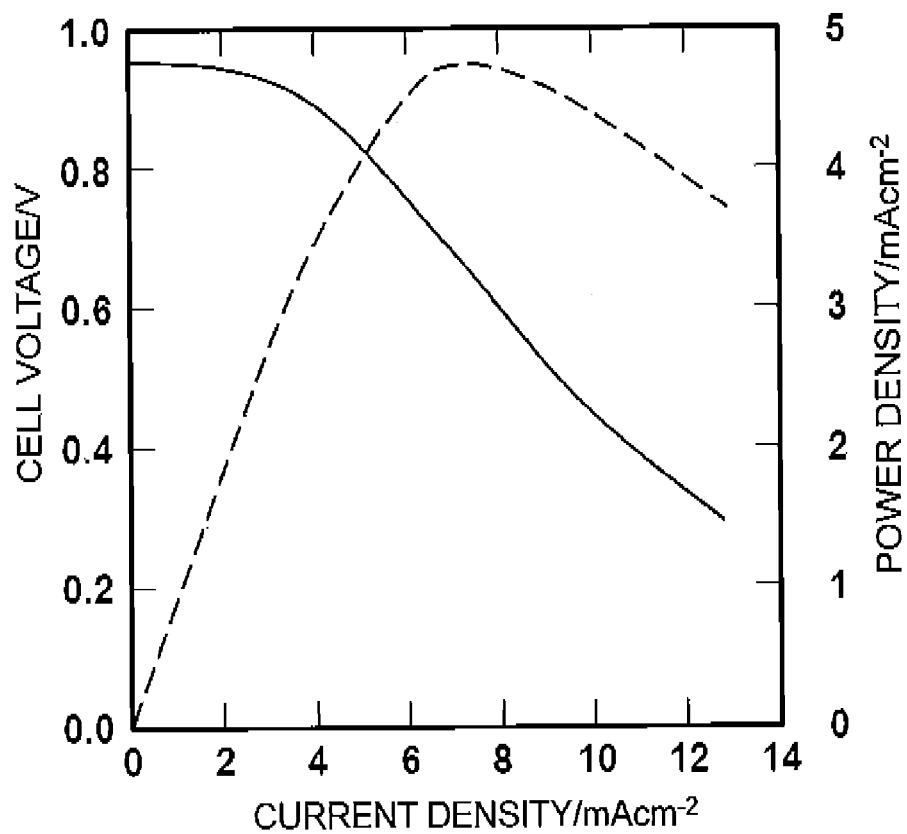
FIG. 4 is a graph illustrating the results of OCV and power density of the evaluation device (fuel cell) of FIG. 3.

An example of the measurement results is illustrated in FIG. 4. FIG. 4 is a graph illustrating cell voltage (V) and power density ($mAcm^{-2}$) values based on the obtained current density ($mAcm^{-2}$) value when the fuel cell 110 was operated under the above-described measurement conditions. As illustrated in FIG. 4, the fuel cell 110 in which pellet A ($LaSr_3Co_3O_{10}$) was used as the solid electrolyte layer 101 exhibited a high performance, in which OCV was 0.96 V and the maximum power density was 4.7 mW/cm².

Example 201

Preparation of Fe—Co—Ni Electrode Catalyst

First, an aqueous nitrate solution containing Fe, Co, and Ni was prepared by dissolving 2.86 g of $Fe(NO_3)_3.9H_2O$, 2.08 g of $Co(NO_3)_2.6H_2O$, and 2.08 g of $Ni(NO_3)_2.6H_2O$ in 10 ml of distilled water so that Fe:Co:Ni was 1:1:1. To this aqueous nitrate solution, while stirring, 1.00 g of carbon black (Vulcan XC72) so that the obtained alloy material would be 55 wt. %, and 10 ml of distilled water were added. Moisture was evaporated over a water bath, and the mixture was dried overnight in an 80° C. oven.

The dried powder was calcined for 3 minutes at 1200° C. (rate of temperature increase: 100 K/min) under a hydrogen atmosphere ($H_2$/Ar 60 ml/min). Then, the calcined powder was allowed to naturally cool, further held at 500° C. in the same hydrogen atmosphere, and calcined for 2 hours.

<Preparation of $NaCo_2O_4$ Sintered Body>

In this preparation, although the following reagents were used, other reagents may be used as appropriate.

Sodium acetate ($CH_3COONa$, Kanto Chemical Co., Inc., special grade)

Cobalt acetate tetrahydrate (($CH_3COO)_2Co.4H_2O$, Wako Pure Chemical Industries, Ltd., Cica special grade)

Dinitrodiammine palladium ($Pd(NO_2)_2(NH_3)_2$, Tanaka Kikinzoku Kogyo K.K.)

Ethylene glycol ($HOCH_2CH_2OH$, Wako Pure Chemical Industries, Ltd., special grade)

The $NaCo_2O_4$ sintered body was prepared according to the following procedures. In the present example, the $NaCo_2O_4$ pellet was produced as described below by undergoing a calcining process at a temperature of about 900° C. Under such high temperature conditions, Na evaporates. Therefore, since impurities ($CO_3O_4$) are produced in a resultant product if the raw material is prepared based on the theoretical amount molar ratio (Na:Co=1:2), here the molar ratio of Na and Co in the raw material was Na:Co=1.6:2.

(1) 5.00 g (60.95 mmol) of sodium acetate and 19.00 g (76.28 mmol) of cobalt acetate tetrahydrate were weighed into a Teflon® beaker having an internal volume of 200 mL, and dissolved using 40 mL of distilled water.
(2) Moisture in the solution obtained in the above (1) was evaporated at 80° C. while stirring, and the resultant product was placed in a dryer (temperature condition: 80° C.), and allowed to dry overnight.
(3) The dried sample was thoroughly ground in an agate mortar, and the ground product was placed in an alumina crucible. This crucible was placed in a muffle furnace, and the sample was calcined in air under conditions of a temperature of 750° C. and a retention time of 5 hours.
(4) The calcined sample was ground in an agate mortar, and the ground product was molded (pressure: 30 MPa, retention time: 5 minutes) into a pellet using a tablet molding machine (diameter: 20 mm, thickness: about 3 mm). The obtained molding was placed in a muffle furnace, and fired in air under conditions of a temperature of 790° C. and a retention time of 3 hours.
(5) The fired sample was placed in a planetary ball mill (FRITSCH pulverisefte), and pulverized under conditions of a rotational speed of 300 rpm and a treatment time of 20 minutes. The obtained powder was placed in a tablet molding machine and molded into pellets (diameter: 10 mm, thickness: 1.7 to 12 mm). In cases where the pellet thickness was 6 mm or less, molding was carried out under conditions of a pressure of 30 MPa and a retention time of 5 minutes. In cases where the pellet thickness was about 12 mm, molding was carried out under conditions of a pressure of 40 MPa and a retention time of 5 minutes. The obtained moldings were placed in a muffle furnace, and sintered in air under conditions of a temperature of 900° C. and a retention time of 32 hours to obtain a $NaCo_2O_4$ sintered body.

<Preparation of Anode Electrode>

0.01 g of each of the above-obtained Fe—Co—Ni electrode catalyst and $NaCo_2O_4$ sintered body (first layered metal oxide) were ground and mixed in an alumina mortar so that the ratio was 1:1. To the mixture, 5 μl of ethylene glycol was added to form a paste, which was coated on the foamed Ni. The temperature of this foamed Ni was increased to 400° C. in a He atmosphere, whereby the ethylene glycol was removed. The metal supported amount in the post-removal foamed Ni was 10 mg/cm².

<Preparation of Cathode Electrode>

10 mg and 5 mg, respectively, of the above-obtained $NaCo_2O_4$ sintered body (second layered metal oxide) and carbon black (Vulcan XC72) were dispersed in ethanol so that the ratio was 2:1, and coated on carbon paper (trade name: P50T, manufactured by Ballard Power Systems Inc.). The coated carbon paper was then allowed to dry overnight. The $NaCo_2O_4$ supported amount after the drying was 10 mg/cm².

<Preparation of Solid Electrolyte Layer>

After leaving to stand for 20 hours, the precipitate that had formed in the aqueous mixture was washed 5 times with water and 3 times with ethanol using a centrifugal separator (trade name: Tabletop Centrifuge 5420, manufactured by Kubota Corporation). The washed precipitate was dried overnight in air (air dried). The dried powder was calcined for 30 minutes at 800° C. (rate of temperature increase: 10 K/min). The calcined powder was molded into a pellet shape 20 mm in diameter and 1 mm thick (pressure: 60 MN, retention time: 10 minutes), and then calcined for 30 minutes at 1000° C. to obtain a $LaSr_3Co_3O_{10}$ pellet as a solid electrolyte layer (rate of temperature increase: 10 K/min).

Figure 6:
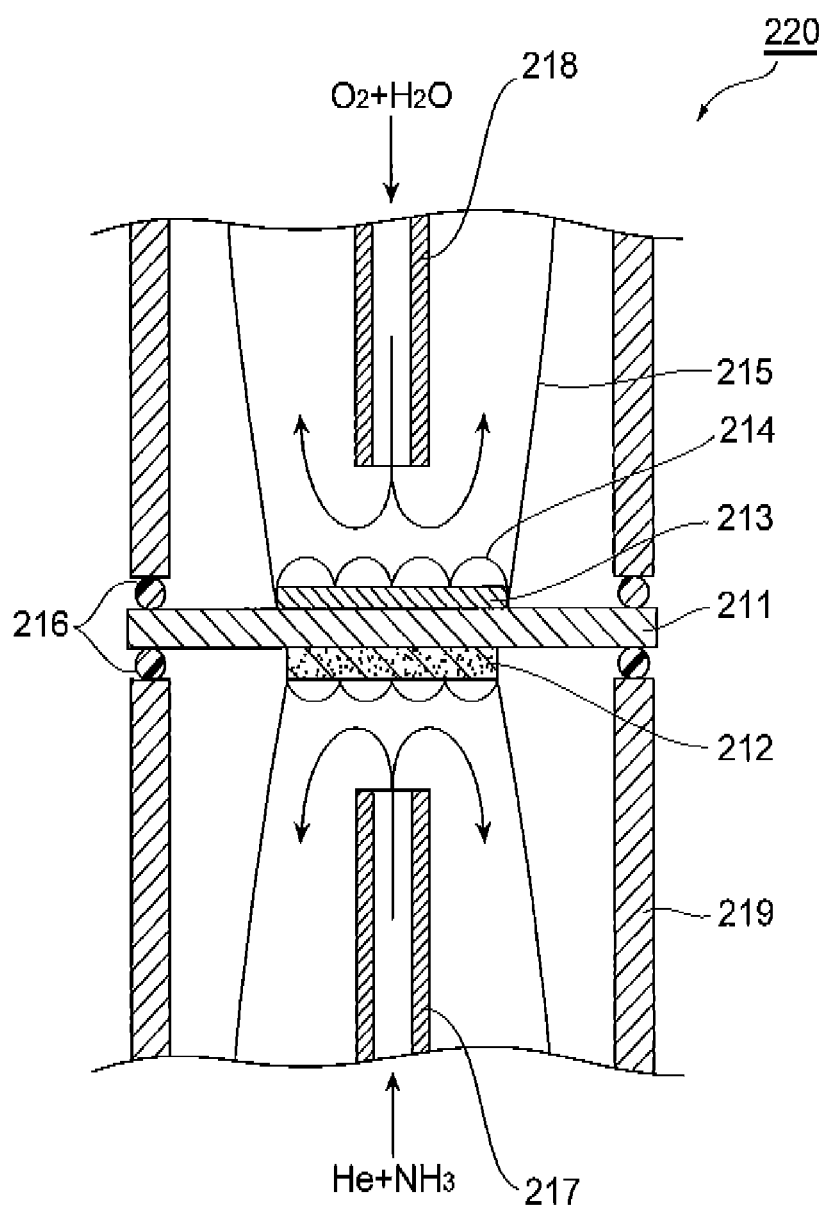
FIG. 6 is a schematic cross-sectional view illustrating an evaluation device (fuel cell)

<Power Generation Test>
Using the above-obtained anode electrode, cathode electrode, and solid electrolyte layer, the evaluation device (fuel cell 220) illustrated in FIG. 6 was prepared. The fuel cell 220 included an anode electrode 212 on one side of a solid electrolyte layer 211 and a cathode electrode 213 on the other side. Further, a fuel gas supply port 217 was provided on the anode electrode 212 side, and an oxygen gas supply port 218 was provided on the cathode electrode 213 side. In addition, so that gas did not leak from the fuel cell 220, a cell body part 219 was arranged on the outside of the ports, and a gasket 216 was arranged between the cell body part 219 and the solid electrolyte layer 211. In this fuel cell 220, a Pt mesh 214 was arranged on the face of the anode electrode 212 and the cathode electrode 213. The output from a conductor wire 215 (Pt wire) connected to this Pt mesh 214 was measured. Moreover, the fuel in this fuel cell 220 was ammonia.

Measurement was carried out according to the following procedures.

(1) The $LaSr_3Co_3O_{10}$ pellet (solid electrolyte layer 211) was pre-treated by increasing the temperature to 280° C., and flowing hydrogen humidified at room temperature for 30 minutes at 5 ml/min.
(2) The foamed Ni (anode electrode 212) having the Fe—Co—Ni/C catalyst and $NaCo_2O_4$ on its face was pre-treated by increasing the temperature to 280° C., and flowing hydrogen humidified at room temperature for 30 minutes at 5 ml/min.
(3) A mixed gas of ammonia and He was supplied to the anode electrode 212 at 20 ml/min, and oxygen humidified at 85° C. was supplied to the cathode electrode 213 at 20 ml/min.
(4) The cell temperature was 80° C.

Comparative Example 201

A fuel cell was constituted and subjected to a power generation test in the same manner as in Example 201, except that, in the preparation of the anode electrode 212, the ratio (weight ratio) of the Fe—Co—Ni alloy catalyst and the $NaCo_2O_4$ sintered body was 2:1.

Figure 7:
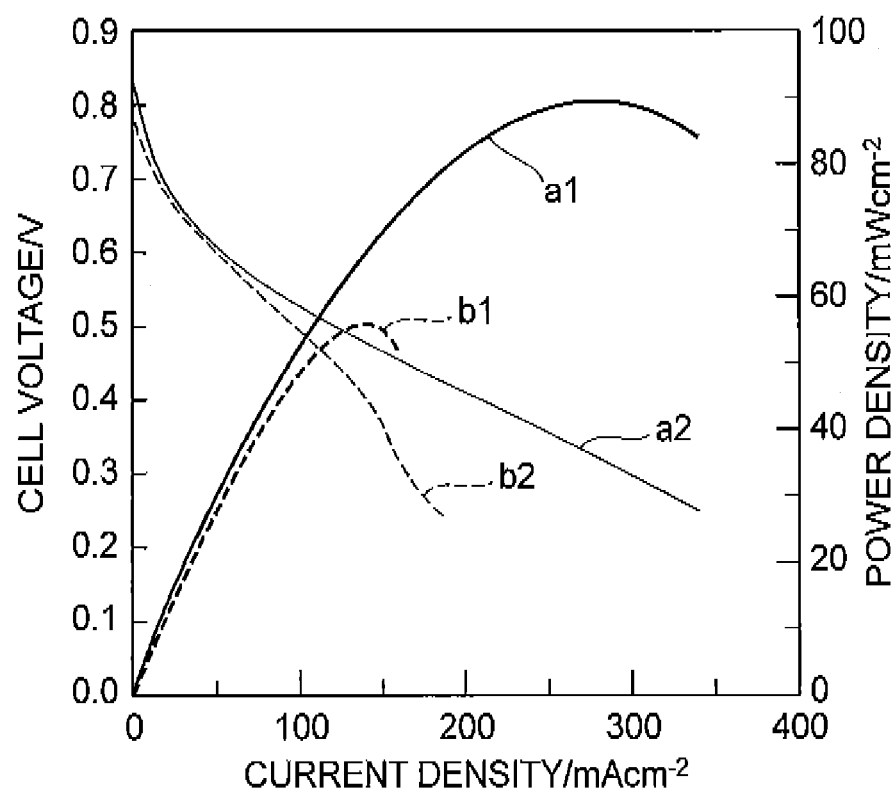
FIG. 7 is a graph illustrating the measurement results of Example 201 and Comparative Example 201.

The results of a comparison of the data obtained in the power generation tests of Example 201 and Comparative Example 201 are illustrated in FIG. 7. FIG. 7 is a graph illustrating cell voltage (V) and power density ($mAcm^{-2}$) values based on the obtained current density ($mAcm^{-2}$) value when the fuel cell 220 was operated under the above-described measurement conditions. a1 and a2 in FIG. 7 represent the cell voltage and power density, respectively, obtained in Example 201, and b1 and b2 represent the cell voltage and power density, respectively, obtained in Comparative Example 201. As shown by a1 and a2 in FIG. 7, the fuel cell of Example 201 exhibited a high performance, in which OCV was 0.8 V or more, the current density could be also increased to 300 $mA/cm^{-2}$ or more, and the power density was 90 $mW/cm^2$. On the other hand, as shown by b1 and b2 in FIG. 7, the fuel cell of Comparative Example 201 exhibited a lower performance than Example 201, in which OCV was 0.8 V, the current density was 200 $mA/cm^{-2}$ or less, and also the power density was 48 $mW/cm^2$.

Comparative Example 202

A fuel cell was constituted and subjected to a power generation test in the same manner as in Example 201, except that, in the preparation of the cathode electrode 213, the ratio between the $NaCo_2O_4$ sintered body and the carbon black (Vulcan XC72) was 5:1.

Figure 8:
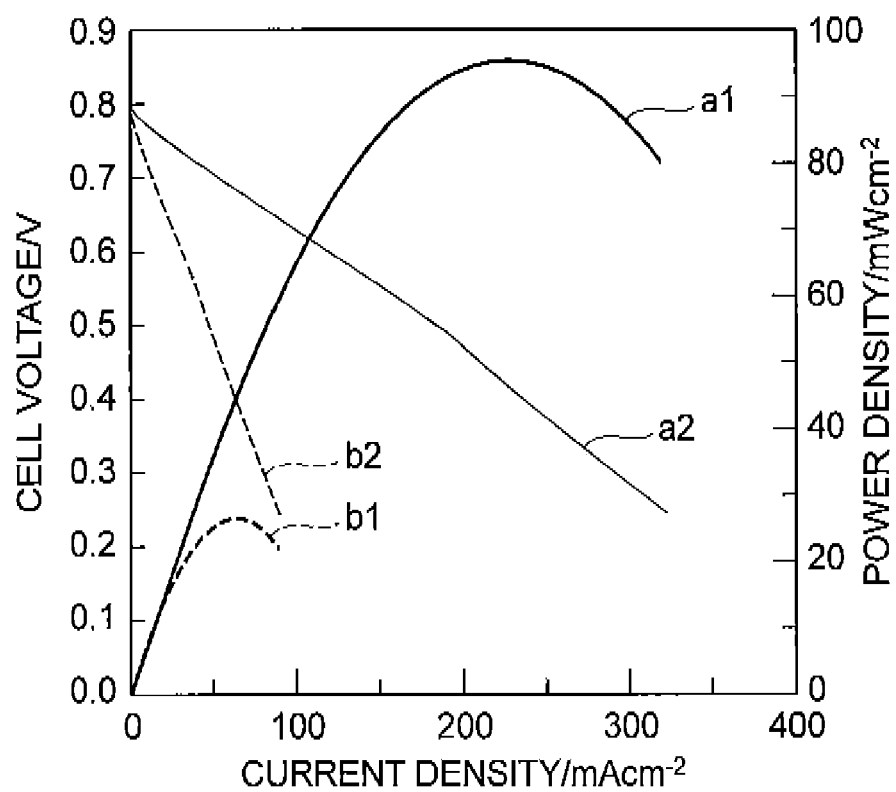
FIG. 8 is a graph illustrating the measurement results of Example 201 and Comparative Example 201.

The results of a comparison of the data obtained in the power generation tests of Example 201 and Comparative Example 202 are illustrated in FIG. 8. FIG. 8 is a graph illustrating cell voltage (V) and power density ($mAcm^{-2}$) values based on the obtained current density ($mAcm^{-2}$) value when the fuel cell 220 was operated under the above-described measurement conditions. a1 and a2 in FIG. 8 represent the cell voltage and power density, respectively, obtained in Example 201, and b1 and b2 represent the cell voltage and power density, respectively, obtained in Comparative Example 202. As shown by b1 and b2 in FIG. 8, the fuel cell of Comparative Example 202 exhibited a lower performance than that in Example 201 shown by a1 and a2, in which OCV was 0.8 V, the current density was 100 $mA/cm^{-2}$ or less, and also the power density was 26 $mW/cm^2$.

Preparation of Fe—Co—Ni Electrode Catalyst

Example 301

First, an aqueous nitrate solution of Fe, Co, and Ni was prepared by dissolving 2.86 g of $Fe(NO_3)_3.9H_2O$, 2.08 g of $Co(NO_3)_2.6H_2O$, and 2.08 g of $Ni(NO_3)_2.6H_2O$ in 10 ml of distilled water so that Fe:Co:Ni was 1:1:1. To this aqueous nitrate solution was, while stirring, 1.00 g of carbon black (Vulcan XC72) so that the obtained alloy material would be 55 wt. %, and 10 ml of distilled water were added. Moisture was evaporated over a water bath, and the mixture was dried overnight in an 80° C. oven.

The dried powder was calcined for 3 minutes at 1200° C. (rate of temperature increase: 100 K/min) under a hydrogen atmosphere ($H_2$/Ar 60 ml/min). Then, the calcined powder was allowed to naturally cool, further held at 500° C. in the same hydrogen atmosphere, and calcined for 2 hours.

Comparative Example 301

An Fe—Co—Ni electrode catalyst was prepared in the same manner as in Example 301, except that the dried powder was calcined just once at 1200° C., and the second calcining at 500° C. was not carried out.

<Structural Analysis of Electrode Catalyst>

The electrode catalysts of Example 301 and Comparative Example 301 were subjected to structural analysis using a powder X-ray diffractometer (Rigaku, RINT-Ultima+). The measurement conditions were as follows.

Radiation source: CuKα,
Wavelength λ: 0.154056 nm,
Tube voltage: 40 kV,
Current: 20 mA,
Measurement range 2θ: 2 to 80°,
Scanning axis: 2θ/θ,
Scan step: 0.02°,
Scan speed: 2°/ruin,
Divergence slit: ½°,
Scattering slit: ½°,
Receiving slit: 0.15 mm.

Figure 9:
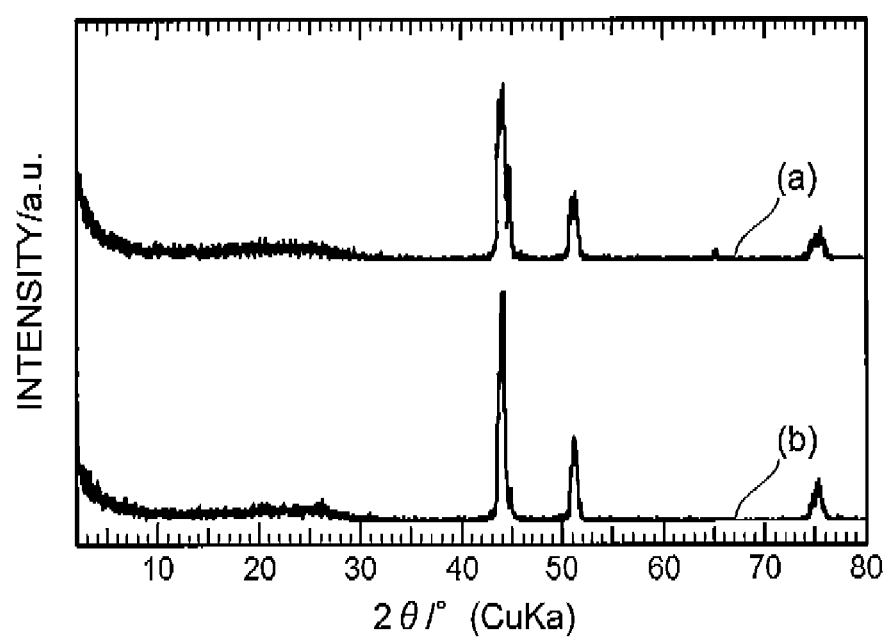
FIG. 9 is a diagram illustrating an XRD pattern (2 to 80°) of the electrode catalyst of Example 301 and Comparative Example 301.
Figure 10:
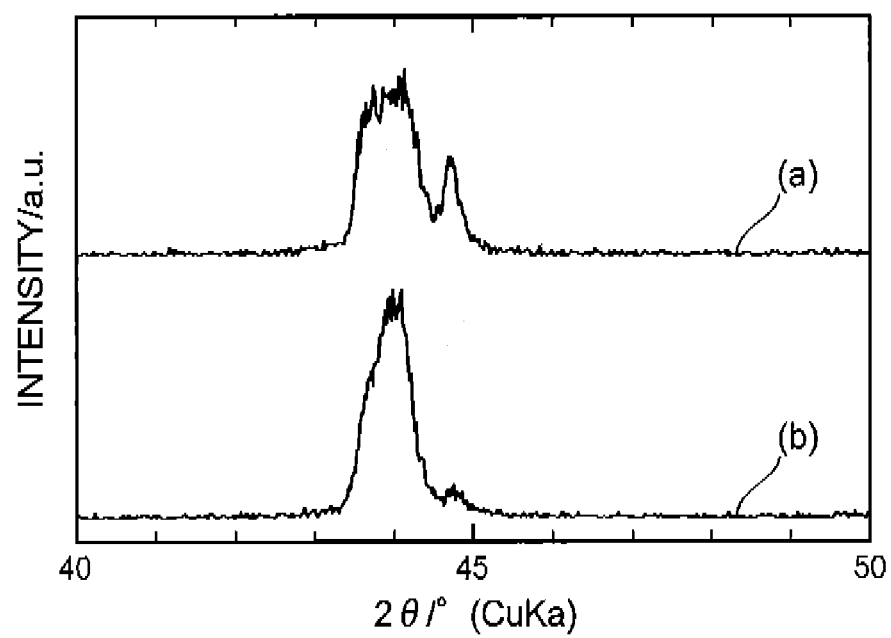
FIG. 10 is a diagram illustrating an enlarged XRD pattern (40 to 50°) of a part of FIG. 9.

An XRD pattern (2 to 80°) of the electrode catalysts of Example 301 and Comparative Example 301 is illustrated in FIG. 9. An XRD pattern (40 to 50°) in which a part of FIG. 9 is enlarged is illustrated in FIG. 10. As illustrated in FIGS. 9 and 10, the diffraction line (a) according to Example 301, which was calcined at 1200° C. and then further calcined at 500° C., exhibited two peaks at 43 to 45°. Consequently, it was confirmed that the electrode catalyst has an alloy material that includes an alloy portion containing Fe, Co, and Ni, and an Fe portion in which the alloy portion is not formed.

On the other hand, the diffraction line (b) according to Comparative Example 301, which was calcined just once at 1200° C., only exhibited one peak at 43 to 45°. Consequently, it was confirmed that the electrode catalyst has an alloy material that includes an alloy portion containing Fe, Co, and Ni, but does not include an Fe portion in which the alloy portion is not formed.

Example 302

Power Generation Test

Figure 11:
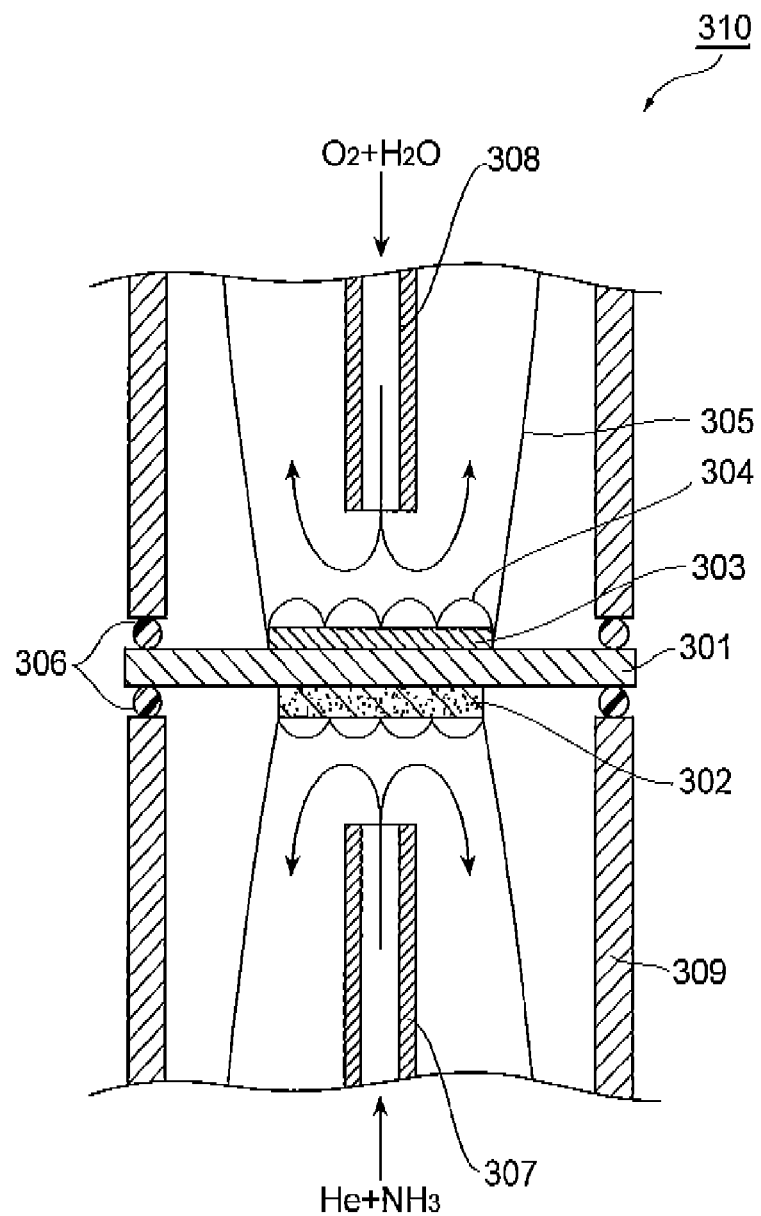
FIG. 11 is a schematic cross-sectional view illustrating an evaluation device (fuel cell) in which the electrode catalyst of Example 301 is used.

In order to evaluate the performance of the Fe—Co—Ni electrode catalyst obtained in Example 301 as an electrode catalyst for a fuel cell, the evaluation device (fuel cell) illustrated in FIG. 11 was prepared. In a fuel cell 310, a $NaCo_2O_4$ pellet was used as a solid electrolyte layer 301, and an anode electrode 302 was arranged on one face of the solid electrolyte layer 301 and a cathode electrode 303 was arranged on the other face. Further, in this fuel cell 310, a Pt mesh 304 was arranged on the face of the anode electrode 302 and the cathode electrode 303. The output from a conductor wire 305 (Pt wire) connected to this Pt mesh 304 was measured. In addition, a fuel gas supply port 307 was provided on the anode electrode 302 side, and an oxygen gas supply port 308 was provided on the cathode electrode 303 side. Still further, so that gas did not leak from the fuel cell 310, a cell body part 309 was arranged on the outside of the ports, and a gasket 306 was arranged between the cell body part 309 and the solid electrolyte layer 301.

Preparation of the $NaCo_2O_4$ pellet will now be described. In, this preparation, although the following reagents were used, other reagents may be used as appropriate.

Sodium acetate ($CH_3COONa$, Kanto Chemical Co., Inc., special grade)

Cobalt acetate tetrahydrate (($CH_3COONa_2Co.4H_2O$, Wako Pure Chemical Industries, Ltd., Cica special grade)

Dinitrodiammine palladium ($Pd(NO_2)_2(NH_3)_2$, Tanaka Kikinzoku Kogyo K.K.)

Ethylene glycol ($HOCH_2CH_2OH$, Wako Pure Chemical Industries, Ltd., special grade)

The $NaCo_2O_4$ pellet was prepared according to the following procedures. In the present example, the $NaCo_2O_4$ pellet was produced as described below by undergoing a calcining process at a temperature of about 900° C. Under such high temperature conditions, Na evaporates. Therefore, since impurities ($Ca_3O_4$) are produced in a resultant product if the raw material is prepared based on the theoretical amount molar ratio (Na:Co=1:2), here the molar ratio of Na and Co in the raw material was Na:Co=1.6:2.

(1) 5.00 g (60.95 mmol) of sodium acetate and 19.00 g (76.28 mmol) of cobalt acetate tetrahydrate were weighed into a Teflon® beaker having an internal volume of 200 mL, and dissolved using 40 mL of distilled water.

(2) Moisture in the solution obtained in the above (1) was evaporated at 80° C. while stirring, and the resultant product was placed in a dryer (temperature condition: 80° C.), and allowed to dry overnight.

(3) The dried sample was thoroughly ground in an agate mortar, and the ground product was placed in an alumina crucible. This crucible was placed in a muffle furnace, and the sample was calcined in air under conditions of a temperature of 750° C. and a retention time of 5 hours.

(4) The calcined sample was ground in an agate mortar, and the ground product was molded (pressure: 30 MPa, retention time: 5 minutes) into a pellet using a tablet molding machine (diameter: 20 mm, thickness: about 3 mm). The obtained molding was placed in a muffle furnace, and fired in air under conditions of a temperature of 790° C. and a retention time of 3 hours.

(5) The fired sample was placed in a planetary ball mill (FRITSCH pulverisette), and pulverized under conditions of a rotational speed of 300 rpm and a treatment time of 20 minutes. The obtained powder was placed in a tablet molding machine and molded into pellets (diameter: 10 mm, thickness: 1.7 to 12 mm). In cases where the pellet thickness was 6 mm or less, molding was carried out under conditions of a pressure of 30 MPa and a retention time of 5 minutes. In cases where the pellet thickness was about 12 mm, molding was carried out under conditions of a pressure of 40 MPa and a retention time of 5 minutes. The obtained moldings were placed in a muffle furnace, and sintered in air under conditions of a temperature of 900° C. and a retention time of 32 hours to obtain a $NaCo_2O_4$ sintered body.

Further, as the anode electrode 302, one was used in which 0.01 g of the Fe—Co—Ni/C catalyst and 0.01 g of $NaCo_2O_4$ prepared in Example 301 were ground and mixed, and coated in a paste. In addition, as the cathode electrode 303, one was used in, which 10 mg of carbon black and 20 mg of $NaCo_2O_4$ were coated on carbon paper (trade name: P50T, manufactured by Ballard Power Systems Inc.).

The measurement performed by the evaluation device (fuel cell) of FIG. 11 was carried out according to the following procedures.

(1) The $NaCo_2O_4$ pellet was pre-treated by increasing the temperature to 280° C., and flowing hydrogen humidified at room temperature for 30 minutes at 5 ml/min.

(2) A foamed Ni (anode) having the Fe—Co—Ni/C catalyst and $NaCo_2O_4$ on its face was pre-treated by increasing the temperature to 280° C., and flowing hydrogen humidified at room temperature for 30 minutes at 5 ml/min, (3) A mixed gas of ammonia and He was supplied to the anode at 20 ml/min, and oxygen humidified at 85° C. was supplied to the cathode at 20 ml/min.

(4) The cell temperature was 80° C.

Comparative Example 302

A fuel cell was constituted and subjected to a power generation test in the same manner as in Example 302, except that the catalyst of Comparative Example 301 was used as the Fe—Co—Ni/C catalyst used for the anode electrode 302.

Figure 12:
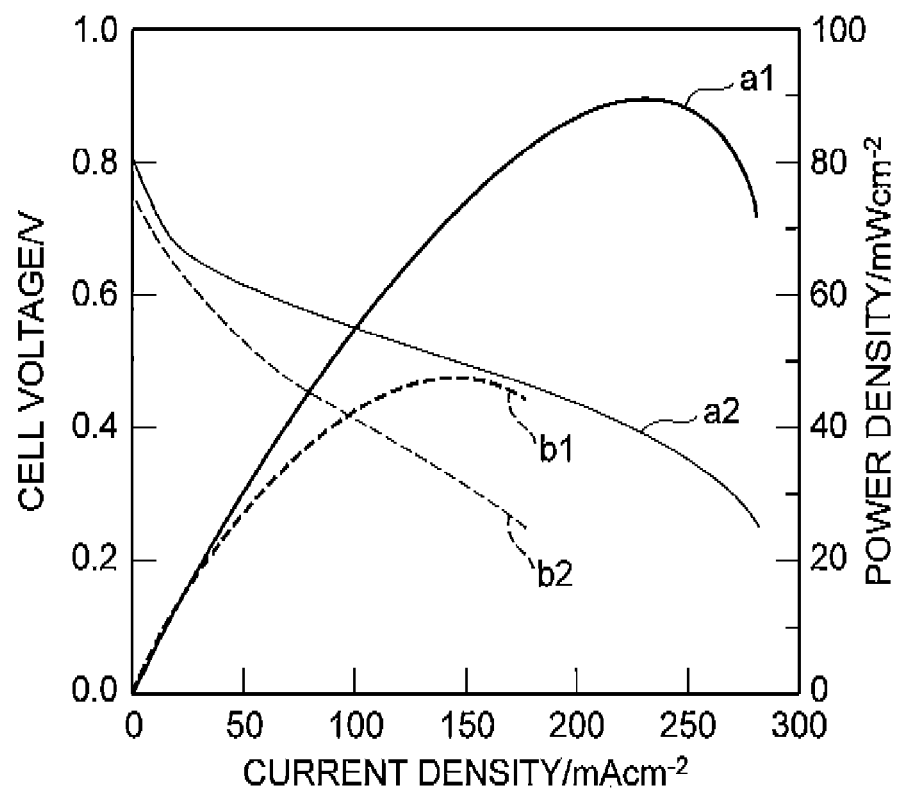
FIG. 12 is a diagram illustrating the measurement results of the fuel cell of Example 302 and Comparative Example 302.

Measurement results of Example 302 and Comparative Example 302 are illustrated in FIG. 12. FIG. 12 is a graph illustrating cell voltage (V) and power density ($mAcm^{-2}$) values based on the obtained current density ($mAcm^{-2}$) value when the fuel cell of Example 302 and Comparative Example 302 was operated under the above-described measurement conditions. a1 and a2 in FIG. 12 represent the value of the cell voltage and current density, respectively, obtained by the fuel cell of Example 302, and b1 and b2 represent the value of the cell voltage and current density, respectively, obtained by the fuel cell of Comparative Example 302. As shown by a1 and a2 in FIG. 12, the fuel cell of Example 302, in which the electrode catalyst (Example 301) according to the present invention was used, exhibited a high performance, in which OCV was 0.8 V and the current density was 280 $mA/cm^{-2}$. On the other hand, as shown by b1 and b2 in FIG. 12, the fuel cell of Comparative Example 302, in which the electrode catalyst of Comparative Example 301 was used, exhibited a lower performance than Example 302, in which OCV was 0.76 V and the current density was 175 in $A/cm^{-2}$.

Example 303

Figure 13:
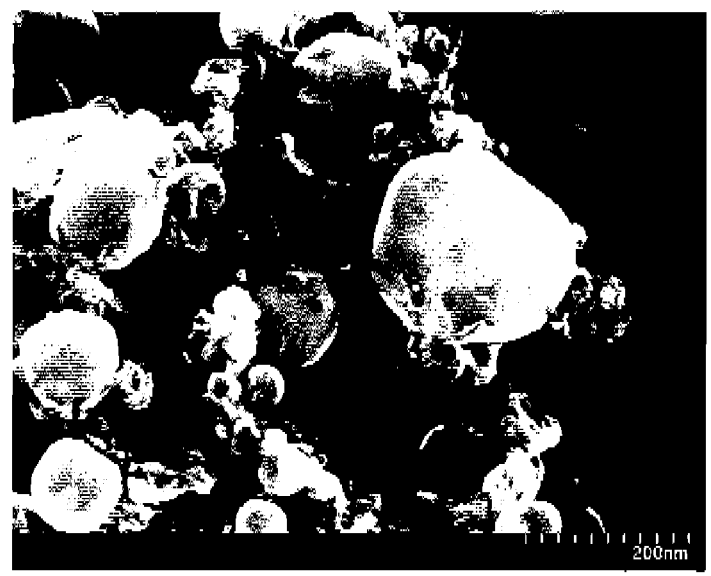
FIG. 13 is a SEM image of the electrode catalyst of Example 303.
Figure 14:
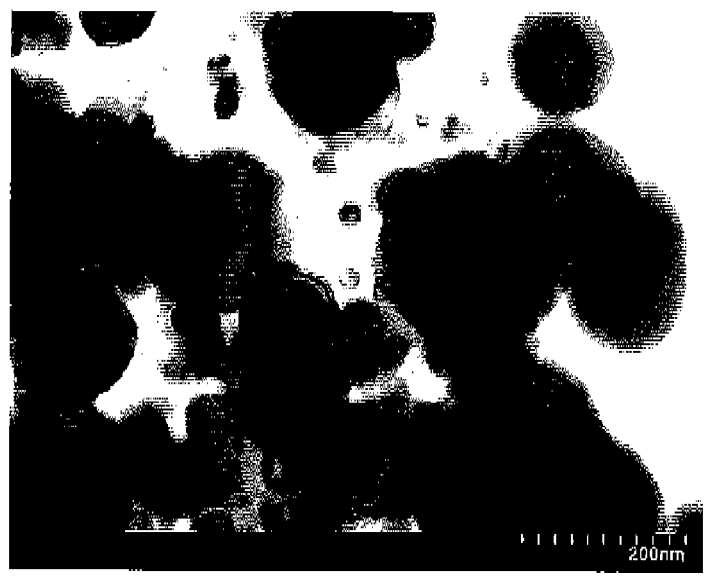
FIG. 14 is a TEM image of the electrode catalyst of Example 303.

An SEM image of an electrode catalyst prepared in the same manner as in Example 301, except that the first calcining temperature was 900° C., is illustrated in FIG. 13, and a TEM image is illustrated in FIG. 14.

DESCRIPTION OF REFERENCE NUMERALS

101, 201, 211 Solid electrolyte layer
102, 202, 212, 302 Anode electrode
103, 203, 213, 303 Cathode electrode
204, 219, 309 Cell body part
205*a*, 205*c*, 217, 218 Gas supply port
205*b*, 205*d* Gas discharge port
110, 210, 220, 310 Fuel cell

What is claimed is:

1. A solid electrolyte comprising a layered metal oxide represented by formula (1), $$(La_{1-x}A_x)(Sr_{1-y}B_y)_3(Co_{1-z}C_z)_3O_{10-\delta} \quad (1)$$

wherein:
A represents a rare earth element other than La;
B represents Mg, Ca, or Ba;
C represents Ti, V, Cr, or Mn;
$0 \leq x < 1$;
$0 \leq y < 1$;
$0 \leq z < 1$; and
$\delta$ represents an oxygen deficiency amount.

* * * * *